(12) United States Patent
Wright

(10) Patent No.: US 8,373,664 B2
(45) Date of Patent: Feb. 12, 2013

(54) TWO CIRCUIT BOARD TOUCH-SENSOR DEVICE

(75) Inventor: David G. Wright, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1044 days.

(21) Appl. No.: 11/642,025

(22) Filed: Dec. 18, 2006

(65) Prior Publication Data

US 2008/0142352 A1  Jun. 19, 2008

(51) Int. Cl.
*G06F 3/041* (2006.01)

(52) U.S. Cl. ..... 345/173; 345/174; 345/176; 178/18.01; 178/18.06; 439/492; 439/493

(58) Field of Classification Search .......... 345/173–175; 178/18.01–18.06, 19.01–19.03; 439/492–499, 439/67–85
See application file for complete search history.

(56) References Cited

U.S. PATENT DOCUMENTS

| | | | | |
|---|---|---|---|---|
| 4,169,641 A | * | 10/1979 | Olsson | 439/493 |
| 4,358,172 A | * | 11/1982 | Narozny | 439/65 |
| 4,531,793 A | * | 7/1985 | Hochgesang | 439/55 |
| 4,745,241 A | * | 5/1988 | Furukawa et al. | 345/173 |
| 4,969,835 A | * | 11/1990 | Kobayashi et al. | 439/161 |
| 5,159,159 A | * | 10/1992 | Asher | 178/18.05 |
| 5,305,017 A | | 4/1994 | Gerpheide | |
| 5,543,591 A | | 8/1996 | Gillespie et al. | |
| 5,565,658 A | * | 10/1996 | Gerpheide et al. | 178/18.02 |
| 5,719,597 A | * | 2/1998 | Fong | 345/174 |
| 5,748,185 A | | 5/1998 | Stephan et al. | |
| 5,752,851 A | * | 5/1998 | Zaderej et al. | 439/493 |
| 5,757,363 A | * | 5/1998 | Oishi et al. | 345/173 |
| 5,869,790 A | * | 2/1999 | Shigetaka et al. | 178/18.03 |
| 5,926,171 A | * | 7/1999 | Matsufusa et al. | 345/173 |
| 5,943,052 A | | 8/1999 | Allen et al. | |
| 5,954,536 A | * | 9/1999 | Fuerst et al. | 439/493 |
| 6,002,594 A | * | 12/1999 | Ledin et al. | 361/803 |
| 6,045,396 A | * | 4/2000 | Tighe | 439/493 |
| 6,188,391 B1 | | 2/2001 | Seely et al. | |
| 6,380,931 B1 | | 4/2002 | Gillespie et al. | |
| 6,414,671 B1 | | 7/2002 | Gillespie et al. | |
| 6,473,069 B1 | | 10/2002 | Gerpheide | |
| 6,508,664 B2 | * | 1/2003 | Phalen | 439/502 |
| 6,680,731 B2 | * | 1/2004 | Gerpheide et al. | 345/173 |
| 6,704,005 B2 | | 3/2004 | Kato et al. | |
| 6,733,319 B1 | * | 5/2004 | Jørgensen | 439/329 |
| 6,819,316 B2 | * | 11/2004 | Schulz et al. | 345/174 |
| 6,825,890 B2 | * | 11/2004 | Matsufusa | 349/12 |
| 6,926,561 B1 | * | 8/2005 | Handforth et al. | 439/632 |
| 6,943,705 B1 | * | 9/2005 | Bolender et al. | 341/33 |

(Continued)

OTHER PUBLICATIONS

Chapweske, Adam, "The PS/2 Mouse Interface", PS/2 Mouse Interfacing, 2001, 10 pages.

(Continued)

*Primary Examiner* — Lun-Yi Lao
*Assistant Examiner* — Gregory J Tryder

(57) ABSTRACT

An apparatus and method for detecting a presence of a conductive object on a sensor array of a first circuit board using active electronic components of a second circuit board, which is coupled to the first circuit board. The apparatus may include a first circuit board, which includes a sensor array of sensor elements, and a second circuit board, coupled to the first circuit board, including sensing circuitry to measure capacitance on the sensor array of the first circuit board. The method may include measuring a capacitance on the sensor array using the active electronic components of the second circuit board, and processing the measured capacitance.

37 Claims, 22 Drawing Sheets

U.S. PATENT DOCUMENTS

| | | | | |
|---|---|---|---|---|
| 6,970,160 | B2* | 11/2005 | Mulligan et al. | 345/173 |
| 7,030,860 | B1* | 4/2006 | Hsu et al. | 345/173 |
| 7,492,433 | B2* | 2/2009 | Imajo et al. | 349/149 |
| 7,671,837 | B2* | 3/2010 | Forsblad et al. | 345/156 |
| 7,850,461 | B2* | 12/2010 | Keefer et al. | 439/67 |
| 2002/0049070 | A1* | 4/2002 | Bick | 455/550 |
| 2003/0025679 | A1* | 2/2003 | Taylor et al. | 345/175 |
| 2004/0119701 | A1* | 6/2004 | Mulligan et al. | 345/173 |
| 2005/0057489 | A1* | 3/2005 | Kung et al. | 345/156 |
| 2006/0066582 | A1 | 3/2006 | Lyon | |
| 2006/0097991 | A1 | 5/2006 | Hotelling et al. | |
| 2006/0232557 | A1* | 10/2006 | Fallot-Burghardt | 345/168 |
| 2006/0274055 | A1* | 12/2006 | Reynolds et al. | 345/174 |
| 2007/0178751 | A1* | 8/2007 | Yamamoto | 439/495 |
| 2007/0279385 | A1* | 12/2007 | Woolley et al. | 345/168 |
| 2008/0006453 | A1* | 1/2008 | Hotelling | 178/18.06 |

OTHER PUBLICATIONS

"CY8C21x34 Data Sheet" CSR User Module (CSR v1.0), Cypress Semiconductor Corporation, Oct. 6, 2005, pp. 1-36.

Ryan Seguine, et al., "Layout Guidelines for PsoC™ CapSense™", Cypress Application Note AN2292, Revision B, Oct. 31, 2005, pp. 1-15.

Dennis Seguine, "Capacitive Switch Scan", Cypress Application Note AN2233a, Revision B, Apr. 14, 2005, pp. 1-6.

\* cited by examiner

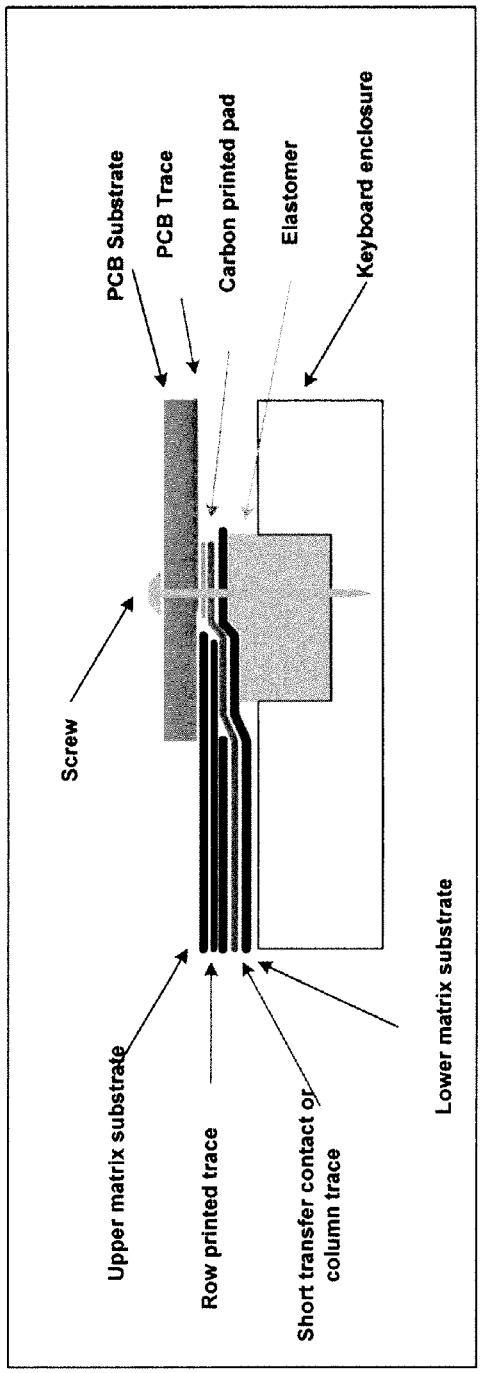
FIG. 1E - Related Art
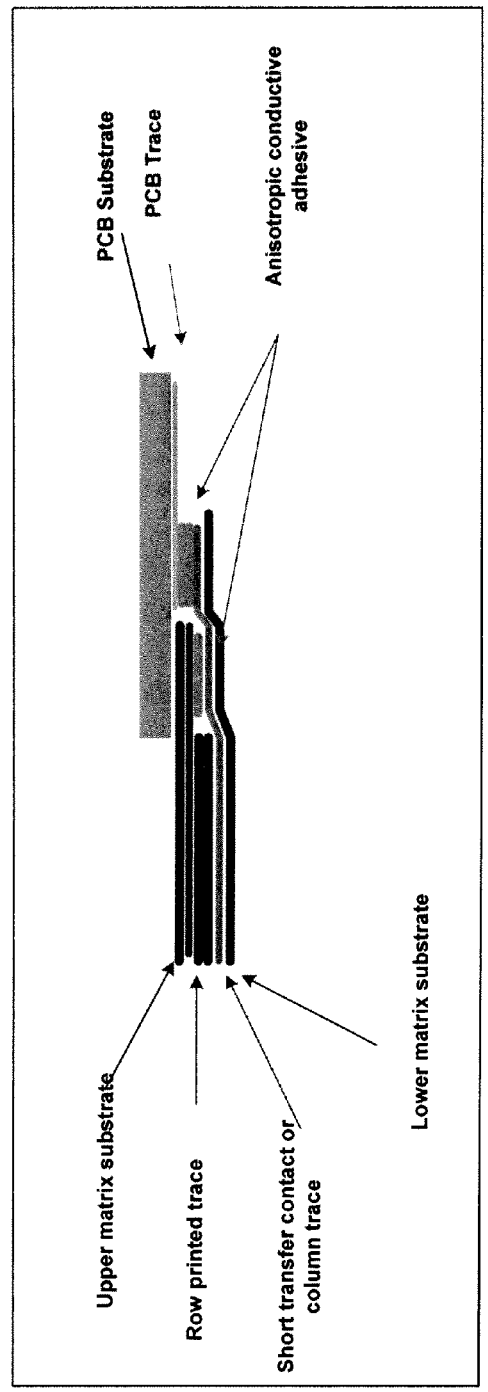
FIG. 1F - Related Art

Conventional Keyboard

Conventional Keyboard with Conventional Touchpad

TOP-VIEW of 2-Layer Touch-Sensor Pad 220

CROSS-SECTIONAL VIEW of 2-Layer Touch-Sensor Pad 220

1200 disposing one or more sensor elements and interconnecting sensor traces on one or more substrates of a first circuit board, which include no active electronic components mounted on it 1201

Mounting to a second circuit board that includes one or more substrates that are separate from the one or more substrates of the first circuit board 1202 connecting the one or more substrates that include no active electronic components to the circuit board that includes the active electronic components 1203

FIG. 12

TWO CIRCUIT BOARD TOUCH-SENSOR DEVICE

TECHNICAL FIELD

This invention relates to the field of user interface devices and, in particular, to touch-sensor devices.

BACKGROUND

Computing devices, such as notebook computers, personal data assistants (PDAs), mobile communication devices, and portable entertainment devices (such as handheld video game devices, multimedia players, and the like) have user interface devices, which are also known as human interface devices (HID), that facilitate interaction between the user and the computing device. One type of user-interface device that has become more common is a touch-sensor pad (also known as a "touchpad"). A touchpad replicates mouse X/Y movement by using two defined axes, which contain a collection of sensor elements that detect the position of a conductive object such as a finger. Mouse right/left button clicks can be replicated by two mechanical buttons, located in the vicinity of the touchpad, or by tapping commands on the touchpad itself. The touchpad provides a user-interface device for performing such functions as positioning a pointer and selecting an item on a display. These touch pads may include multi-dimensional sensor arrays for detecting movement in multiple axes. The sensor array may include a one-dimensional sensor array to detect movement in one axis. The sensor array may also be two dimensional to detect movement in two axes.

One type of touchpad operates by way of capacitance sensing utilizing capacitive sensors. The capacitance detected by a capacitive sensor may change as a function of the proximity of a conductive object to the sensor. The capacitance may also change due the surface area of the conductive object that is in contact with the sensing device. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn develops electrical signals representative of the position of the conductive object in relation to the touch-sensor pad in the X and Y dimensions. A touch-sensor strip, slider, or button operates on the same capacitance-sensing principle.

Conventional capacitive touch pads are constructed on four-layer printed and two-layer printed circuit boards (PCBs). For example, U.S. Pat. Nos. 5,869,790 and 6,188,391 describe a four-layer and two-layer PCB, respectively. In a conventional four-layer touchpad, the first and second layers contain the horizontal and vertical sensor elements (also referred to as pads) and interconnecting sensor traces that form the capacitive sensor matrix; the third layer contains a ground plane; and, the fourth layer contains the controller and associated circuitry and interconnections to the capacitive sensor matrix. In some conventional two-layer touch pads, one layer contains the horizontal sensor elements and their corresponding interconnecting sensor traces; the second layer contains the vertical sensor elements and their interconnecting sensor traces; and, the controller resides on either of the two layers. It should be noted that in the field of capacitive touch pads, in reference to multiple-layer touch pads (e.g., "two-layer" or "four-layer" touch pads), the term "layer" is conventionally used to refer to a side of a non-conductive substrate upon which conductive material is disposed. It appears that the conventional meaning of the term "layer" is followed in U.S. Pat. Nos. 5,869,790 and 6,188,391, as discussed in further detail below.

FIG. 1A illustrates a four-layer touchpad as described in U.S. Pat. No. 5,869,790. The first layer 2 resides on the topside of the PCB having sensor traces 4 disposed in the vertical direction. These vertical sensor traces connect to vertically-aligned sensor elements disposed on the first layer (not shown). The second layer 12 resides on the underside of the PCB having sensor traces 13 disposed in the horizontal direction. These horizontal sensor traces connect to horizontally-aligned sensor elements disposed on the second layer (not shown). The third layer 3 is buried in the substrate of the PCB and houses the ground plane, which may connect to the topside or underside of the PCB using conductive traces and vias. Lastly, the fourth layer 14 includes the sensing circuit 15.

FIG. 1B illustrates one conventional two-layer touchpad described in U.S. Pat. No. 6,188,391. FIG. 1B of the present application is a reproduction of FIG. 2 of U.S. Pat. No. 6,188,391 with the addition of reference numbers for some components that were unlabeled in FIG. 1B of U.S. Pat. No. 6,188,391. The conventional two-layer touchpad illustrated in FIG. 1B of the present application contains the following: a capacitive sensor matrix 42, or array, having horizontal sensor elements 45 and vertical sensor elements 43 (represented by diamonds) and interconnecting horizontal sensor traces 44 and vertical sensor traces 46; and, a controller chip 48 disposed on the same side of the PCB 47 as the sensor array 42. Although the horizontal sensor traces 44 and vertical sensor traces 46 appear to reside on the same layer in FIG. 1B, such is only for conceptual purposes to understand the functional inter-relationship of the horizontal and vertical sensor elements of the array 42. As described in regards to FIGS. 1 and 2 of U.S. Pat. No. 6,188,391, which would be apparent to one of ordinary skill in the art, the horizontal sensor elements 43 and their interconnecting row sensor traces 44 reside on a different layer than the vertical sensor elements 45 and their interconnecting column sensor traces 46. The controller chip 48 resides on one of these two different layers. Accordingly, the touchpad illustrated in FIG. 1B is a "two-layer" touchpad.

U.S. Pat. No. 6,188,391 describes the use of screen-printing carbon ink patterning to fabricate some of the conductive sensor traces to realize a two-layer board with the controller chip disposed on the opposite side (i.e., the second layer) of the board as the sensor elements and interconnecting conductive sensor traces (i.e., metal and conductive ink). FIG. 1C is a cross-sectional view illustrating the two-layer touch pad of the purported invention of U.S. Pat. No. 6,188,391. FIG. 1C of the present invention is a reproduction of FIG. 8B of U.S. Pat. No. 6,188,391 with the addition of the controller chip 110. It should be noted that in U.S. Pat. No. 6,188,391 the first layer (referred to as a single composite layer) contains both the horizontal sensor traces 69 and vertical sensor traces 104, as illustrated in FIG. 1C. The second layer is on the underside of the printed circuit board and contains the controller chip 110 (which is not shown in the illustration of FIG. 8B of U.S. Pat. No. 6,188,391 but included in FIG. 1C of the present application for ease of understanding). Accordingly, the touchpad produced using screen-printing carbon ink patterning described in U.S. Pat. No. 6,188,391 is a two-"layer" touchpad because the conductive material that constitutes the controller and associated interconnection circuitry to the array is located on a different side (i.e., layer) of the non-conductive PCB substrate (e.g., constructed from FR4 (Flame Resistant 4) PC board laminate) than that of the conductive material used to form the sensor array.

As can be seen from an inspection of FIG. 1C of the present application (and also FIG. 8B of U.S. Pat. No. 6,188,391), the topside layer containing both the horizontal and vertical sensor element layers is a "composite layer," as it is referred to by U.S. Pat. No. 6,188,391. In such a composite layer, the vertical, carbon ink, interconnecting sensor traces 104 and the horizontal metal interconnecting sensor traces 69 reside in two different planes. The sensor elements 68 (sense pads illustrated by diamonds) and the horizontal metal interconnecting sensor traces 69 reside in a lower plane 130 than the vertical carbon ink sensor traces 104. The vertical carbon ink interconnecting sensor traces 104 reside on a substantially different plane 140 that is on top of the plane containing the sensor elements and the horizontal metal interconnecting sensor traces 130. Although some portion of the carbon ink sensor traces 104 may dip into the lower plane 130 in areas between the horizontal metal interconnecting sensor traces of the lower plane 130 (otherwise occupied by insulation 103), the carbon ink sensor traces 104 cannot reside in the same area of the lower plane 130 than is occupied by the horizontal metal interconnecting sensor traces 69 and their corresponding horizontal sense pads 68.

The substrate(s) of each of these conventional PCBs are made are constructed of material, such as FR4 composite, that is relatively more expensive than conductive ink on polymer construction of a typical keyboard key matrix. FR1 and FR2 composites may also be used. FR1 and FR2 are lower cost PCB substrates than FR4, but still more expensive than the film construction.

FIG. 1D illustrates a simplified version of a conventional keyboard matrix. A conventional keyboard matrix is constructed as two substrates (e.g., two thin sheets of plastic or polymer, for example, Polyethylene terephthalate (PET), also known as PETE, PETP, or PET-P) with conductive traces (typically silver ink) printed on them, arranged such that when pressure is applied at certain locations, one trace on one sheet makes an electrical connection with one trace at the corresponding location on the other sheet. The keyboard buttons are each positioned over one of these locations, so that when the keyboard button is pressed, pressure is applied to the upper sheet at one of these locations causing it to touch a trace on the lower sheet, causing an electrical contact to be made. Typically, the two sheets are separated by a third sheet with no traces printed, and holes located at each of the button positions, so that when no pressure is applied to the area above the hole, the conductive traces on each of the other two sheets are not in contact. It should be noted, however, that FIG. 1D illustrates a small number of rows and columns, and that conventional keyboard matrices may include more rows and/or columns.

The traces on the two printed sheets are arranged such that each trace on the upper sheet crosses each trace on the lower sheet over a hole once and only once. In this way, each button on the keyboard makes a unique contact between one of the traces on the upper sheet and one of the traces on the lower sheet. Typically, one sheet has eight traces (referred to as the key matrix Rows) and the other sheet has between sixteen and twenty-four traces (referred to as Columns). In this way, an 8×16 or 8×24 matrix is formed, with each key or button corresponding to a single point in the matrix.

The keyboard matrix is connected to a main PCB with the keyboard controller (e.g., keyboard controller integrated circuit (IC)) using a compression contact. These compression contacts may be an inexpensive compression contact.

FIG. 1E illustrates a cross-sectional view of a conventional keyboard matrix coupled to the main keyboard PCB with the keyboard controller. The row traces on the lower side of the upper sheet contact with short traces on the upper side of the lower sheet, and these short connecting traces, and also the column traces on the lower sheet contact to carbon-printed pads on the controller PCB. Typically, a non-conducting rubber elastomer is situated in a groove in the keyboard enclosure, and the matrix sheets are laid over the elastomer (with the contacts on the lower sheet facing upwards). The PCB is placed over the contacts so that the carbon-printed contacts are facing down, making contact with the lower sheet contacts, and the PCB is screwed down with screws into the keyboard enclosure. By screwing down the PCB to the keyboard enclosure, the elastomer is under compression, making a pressure contact between the sheet contacts and the PCB contacts.

FIG. 1F illustrates a cross-sectional view of a conventional keyboard matrix coupled to the main keyboard PCB with the keyboard controller using anisotropic conductive adhesive. Contact between the PCB contacts of the main PCB and the sheet contacts are made disposing an anisotropic conductive adhesive between the PCB contacts and the sheet contacts. Anisotropic conductive adhesives only conduct in one direction, and effectively, behave like a connector in one direction (e.g., up/down), but not in the other directions (e.g., side/side and in/out). Anisotropic conductive adhesives are known by those of ordinary skill in the art, and accordingly, additional details regarding them have not been disclosed.

The construction of these conventional keyboard matrices are very inexpensive compared to the conventional circuit boards used for touchpads. For example, the cost of all 3 sheets together is typically around $0.40, with the area of each sheet being around 100 square inches. This compares with around $0.04 to $0.06 per square inch for a two-layer FR4 PCB and around $0.08 to $0.10 for a four-layer FR4 PCB. Accordingly, for a typical PC keyboard, with a 100 square inch matrix area, the total cost of a FR4 PCB is around $4.00 to $6.00 for a two-layer FR4 PCB and $8.00 to $10.00 for a four-layer FR4 PCB.

In addition, the construction of conventional touchpads is typically thicker than the thickness of the construction of keyboard matrices. This is due to the thickness of the conventional substrate(s) used for touchpads, such as FR4. Typical thicknesses of FR4 PCBs are 1.6 mm and 0.8 mm. FR4 PCBs have a thickness of 0.4 mm is somewhat more expensive, but becoming more widely used, especially in touchpad applications.

In another conventional design, a conventional touchpad can be implemented with a conventional keyboard matrix. Typically, both the conventional touchpad and conventional keyboard matrix each include separately circuit boards connected by an interconnecting wire.

FIG. 1G illustrates a conventional keyboard having a keyboard circuit board coupled to the keyboard matrix substrate. The conventional keyboard has a keyboard matrix substrate to which keyboard matrix traces are disposed to detect when a key of the keyboard has been pressed. The conventional keyboard also has a keyboard circuit board. A keyboard controller (e.g., keyboard controller IC) can be coupled to the substrate of the keyboard circuit board. The keyboard circuit board is coupled to a host via a cable.

FIG. 1H illustrates a system having a conventional keyboard coupled to a conventional touchpad. The conventional keyboard, as described above with respect to FIG. 1G, is coupled to a touchpad circuit board via an interconnecting cable. The touchpad circuit board is a separate circuit board from the circuit board of the keyboard circuit board. A touchpad controller (e.g., touchpad controller IC) can be coupled to the substrate of the touchpad circuit board, as described above, for example, on a back side of the substrate of a 2-layer touchpad.

BRIEF DESCRIPTION OF THE DRAWINGS

The present invention is illustrated by way of example, and not by way of limitation, in the figures of the accompanying drawings.

FIG. 1E illustrates a cross-sectional view of a conventional keyboard matrix coupled to the keyboard circuit with the keyboard controller using an elastomer and a screw.

FIG. 1F illustrates a cross-sectional view of a conventional keyboard matrix coupled to the keyboard circuit with the keyboard controller using anisotropic conductive adhesive.

FIG. 12 illustrates a flow chart of one embodiment of a method for manufacturing an electronic system having multiple circuit boards.

DETAILED DESCRIPTION

Figure 1A:
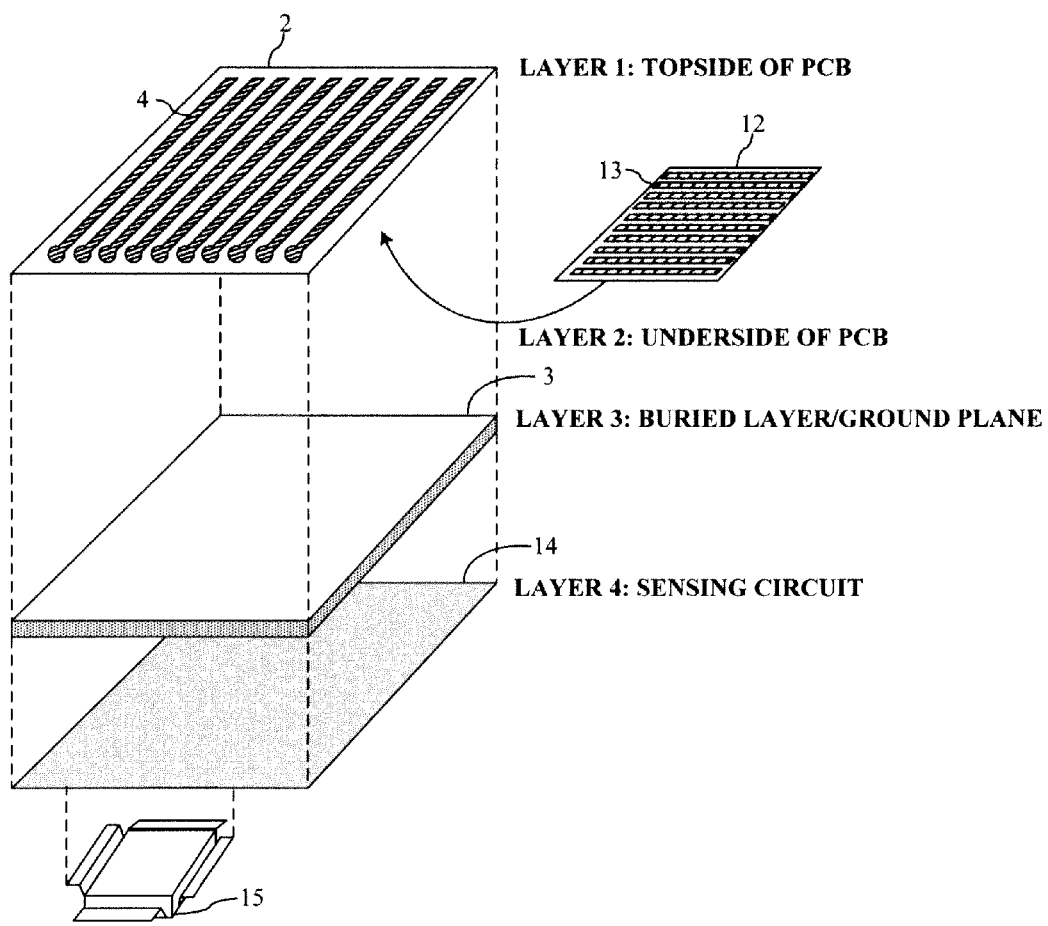
FIG. 1A illustrates a conventional four-layer touchpad PCB.
Figure 1B:
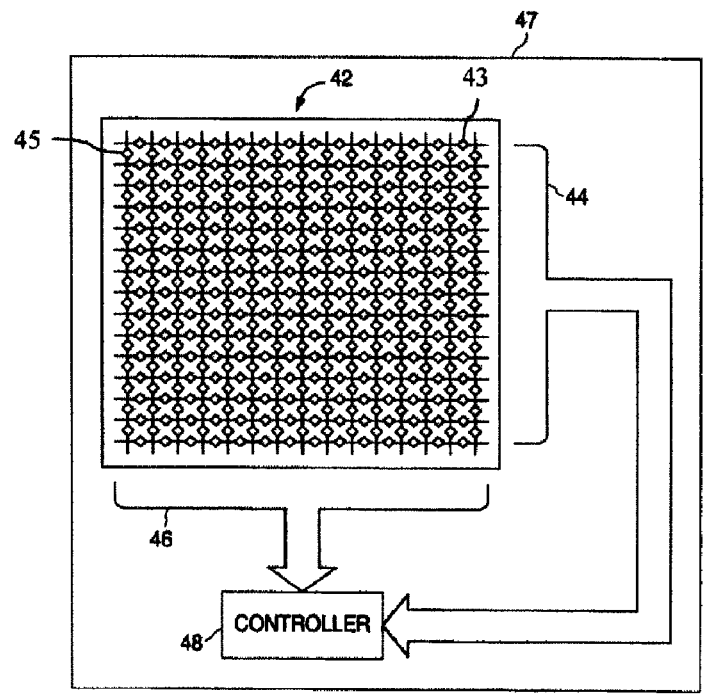
FIG. 1B illustrates a conventional two-layer touchpad PCB.
Figure 1C:
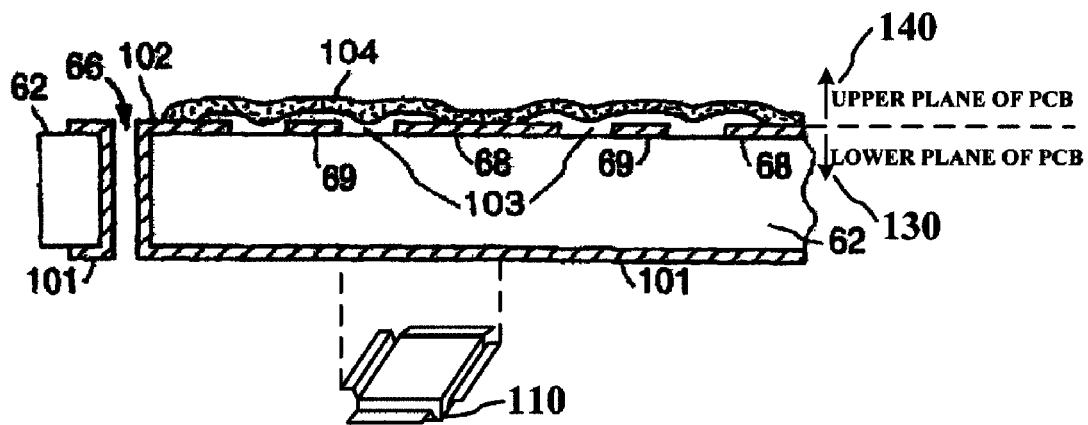
FIG. 1C illustrates a cross-sectional view of a conventional two-layer touchpad PCB.
Figure 1D:
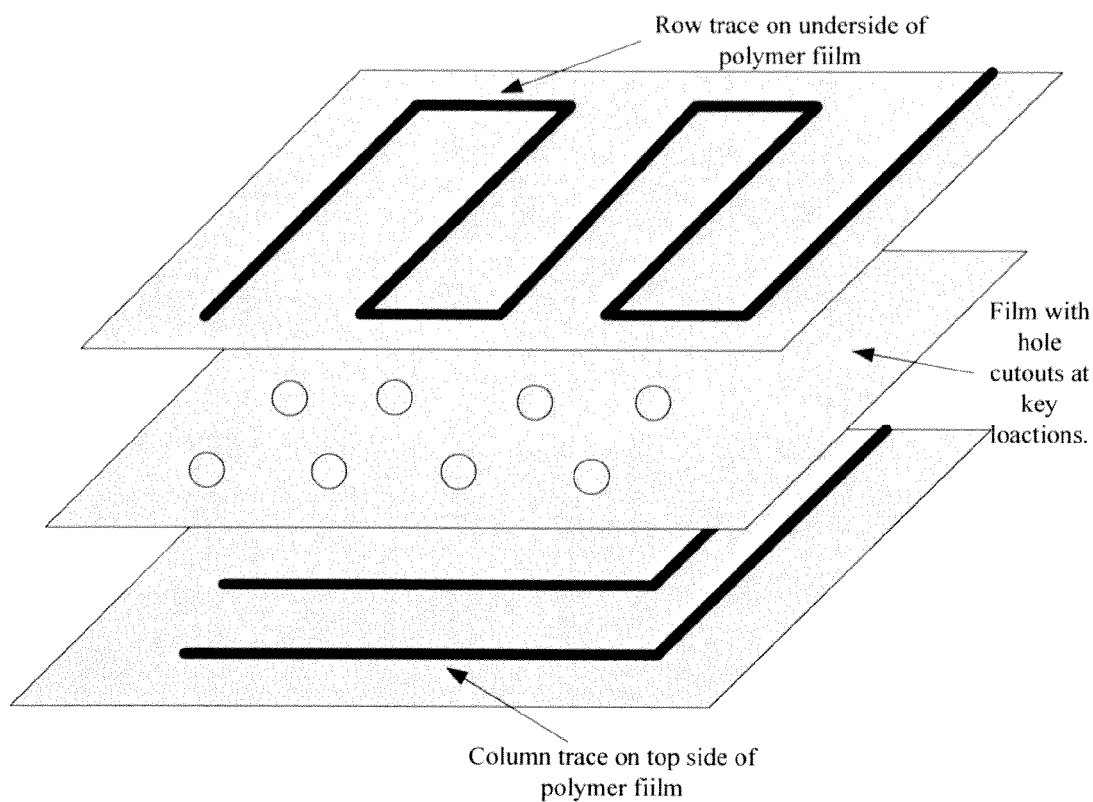
FIG. 1D illustrates a simplified version of a conventional keyboard matrix.
Figure 1G:
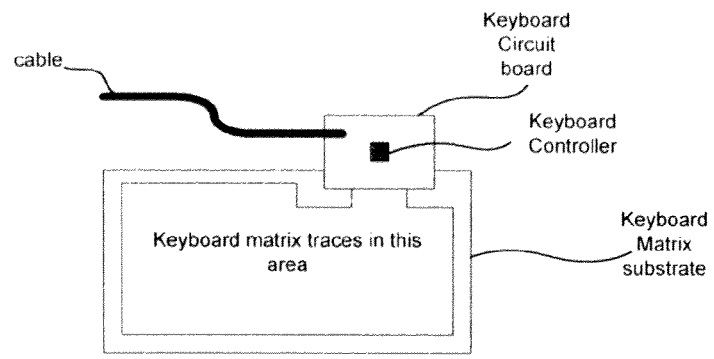
FIG. 1G illustrates a conventional keyboard having a keyboard circuit board coupled to the keyboard matrix substrate.
Figure 1H:
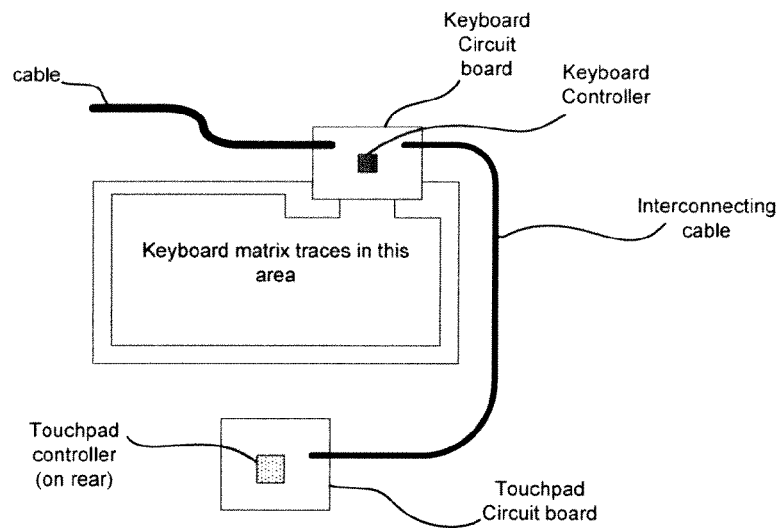
FIG. 1H illustrates a system having a conventional keyboard coupled to a conventional touchpad.

Described herein is an apparatus and method for detecting a presence of a conductive object on a sensor array of a first circuit board using active electronic components of a second circuit board, which is coupled to the first circuit board. Also, described herein is a method for manufacturing the apparatus. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

In one embodiment, the method may include measuring a capacitance on the sensor array using the active electronic components of the second circuit board, and processing the measured capacitance. In one embodiment, the apparatus may include a first circuit board including a sensor array of sensor elements, and a second circuit board coupled to the first circuit board, including sensing circuitry to measure capacitance on the sensor array of the first circuit board. The first circuit board may include one or more substrates with one or more capacitance sensor elements and interconnecting sensor traces. The first circuit board does not include active electronic components to measure a capacitance on the one or more capacitance sensor elements. The second circuit board may include active electronic components to measure the capacitance on the one or more capacitance sensor elements of on the first circuit board. The first and second circuit boards are coupled together using methods known by those of ordinary skill in the art.

Also, described herein is a method of manufacturing for separately disposing the sensor array circuitry (e.g., sensor array and the interconnecting sensor traces of the sensor array) from the circuit board substrate that includes the sensing and/or the processing circuitry. By separately disposing the sensor array circuitry from the sensing and processing circuitry, the sensor array circuitry may be manufactured using a lower cost construction than the construction of conventional touchpads. The lower cost construction of the sensor array may be similar to that of conventional keyboard matrix circuitry.

The touchpad sensing area (e.g., sensor array and interconnecting sensor traces) may be separate from a PCB containing the sensing circuitry, for example, the sensor array may be disposed on a substrate (e.g., sensor array substrate) that is separate from the circuit board substrate that includes the sensing and/or the processing circuitry. The sensor array may be constructed from conductive ink conductors printed on a polymer film, such as PET. However, other materials for the sensor array may also be used.

In one embodiment, the "X-axis" sensor elements and interconnecting sensor traces are printed on the top side of a polymer film substrate (e.g., PET), and the "Y-axis" sensing elements and interconnecting sensor traces are printed on the lower side of the same polymer film substrate. The capacitance between a conductive object (e.g., touchpad operating finger) and the lower traces may be slightly smaller than the capacitance between the conductive object and the upper traces because of the additional thickness introduced by the polymer film substrate. This additional thickness, however, is relatively small since polymer films are thin, as compared to other substrate material, such as FR4. The difference in capacitance may be corrected by either the sensing circuitry or processing algorithms of a processing device.

In one embodiment, the sensing circuitry is disposed (e.g., mounted or printed) on a separate circuit board (e.g., PCB) to which the sensor array circuitry of the first circuit board is connected. The separate circuit board may be smaller in size than conventional touchpad circuit boards since the separate circuit board does not include the sensor array circuitry. Typically, the sensor array circuitry takes up more surface area of the substrate than the processing device (e.g., capacitance sensing circuitry and/or processing circuitry), and by disposing the sensor array circuitry on a separate circuit board, the surface area of the second circuit board can be reduced. By reducing the size of the second circuit board, the cost of manufacturing is reduced since the second circuit board does not include a larger surface area upon which the sensor array circuitry is disposed. The cost of manufacturing may be further reduced by disposing the sensor array circuitry on a circuit board that includes a substrate material (e.g., PET) that is cheaper than the substrate material used for the sensing circuitry (e.g., FR4) and/or the substrate material used in conventional touchpads. The connection between the two circuit boards may be via a connector, or alternatively, via a pressure contact connector. The connection between the two circuit boards may be done using connectors that are similar to those described above with respect to conventional keyboard matrix and keyboard controller. For example, the connection may be made using a connector, a fastener, an elastomer, a screw, a metal spring clip, a compressive clamp, or other mechanical connectors known by those of ordinary skill in the art. Alternatively, electrical contact may be made between the two circuit boards using pressure contact connectors, such as a compressive clamp, or using anisotropic conductive adhesive material.

In another embodiment, the sensor elements are printed on the same side of the polymer film substrate (e.g., top or bottom side of the substrate). Either the X or Y-axis interconnecting sensor traces are printed at the same time as the sensor elements. Similarly, traces to the edge of the polymer film substrate may be printed to be used for connection to the sensing circuitry of the PCB. Next, an insulating ink is printed on top of the first set of interconnecting sensor traces, and then conductive ink is printed over the insulating ink to provide contact (e.g., interconnecting sensor traces of conductive ink) between the sensor elements of the other axis.

In another embodiment, tapered sensor elements may be printed on the same side of the polymer film substrate (e.g., top or bottom side of the substrate). The tapered sensor elements are disposed on a single-layer, non-conductive substrate, where one or more sensor traces lie substantially on the same plane as the tapered sensor elements. The method of manufacturing may include printing only one single layer of conductive material for both the sensor elements and the interconnecting sensor traces, without printing additional layers, such as the insulating ink and the second layer of conductive ink, as described above.

It should be noted that other constructions are possible using two substrates, either singly or in combination with an insulating film between the two substrates.

Also described herein are embodiments of a sensor array of a touchpad implemented with a keyboard matrix. These embodiments may be used in a laptop computer, a hybrid touchpad-keyboard device, or other electronic devices that include these two types of user interface devices.

As described above, the embodiments described herein may reduce the construction costs of the sensing device (e.g., cost of manufacturing the first and/or second circuit boards). The embodiments described herein may also reduce the thickness of the sensing device, for example, the thickness of the sensor array substrate (e.g., PET film) may be reduced from the substrates used for conventional sensor arrays (e.g. 2-layer, or 4-layer FR4 PCBs). The embodiments described herein may also allow the construction of a unified keyboard and touchpad assembly, reducing the construction costs and/or the thickness of the assembly.

Figure 2:
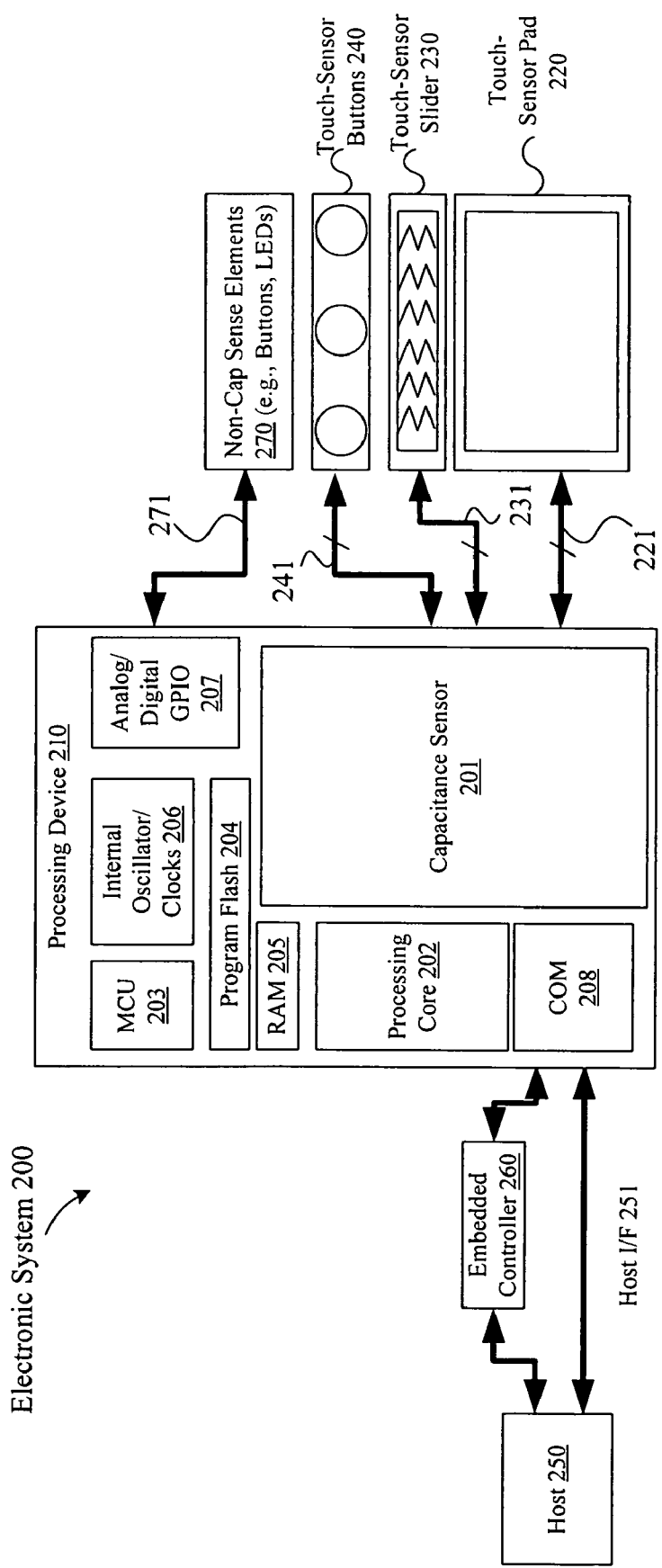
FIG. 2 illustrates a block diagram of one embodiment of an electronic system having a processing device for detecting a presence of a conductive object.

FIG. 2 illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using, in one embodiment, configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch screen, a touch-sensor slider 230, or a touch-sensor button 240 (e.g., capacitance sensing button). It should also be noted that the embodiments described herein may be implemented in other sensing technologies than capacitive sensing, such as resistive, optical imaging, surface wave, infrared, dispersive signal, and strain gauge technologies. Similarly, the operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array includes multiple sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array includes multiple sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array includes multiple sensor elements. For a touch-sensor button, the sensor elements may be coupled together to detect a presence of a conductive object over the entire surface of the sensing device. Alternatively, the touch-sensor button 240 has a single sensor element to detect the presence of the conductive object. In one embodiment, the touch-sensor button 240 may be a capacitance sensor element. Capacitance sensor elements may be used as non-contact sensor elements. These sensor elements, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-added functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 250 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interfaces (SPI). The host 250 and/or embedded controller 260 may be coupled to the processing device 210 with a ribbon or flex cable from an assembly, which houses the sensing device (e.g., sensor array) and processing device (e.g., sensing circuitry and/or processing circuitry).

In one embodiment, the processing device 210 is configured to communicate with the embedded controller 260 or the host 250 to send and/or receive data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard pointer control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In one embodiment, the processing device 210 may operate to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the pointer, scroll-up, scroll-down, scroll-left, scroll-right, step Back, and step Forward. In another embodiment, the data sent to the host 250 include the position or location of the conductive object on the sensing device. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the pointer, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may also be done in the host.

In one embodiment, the method and apparatus described herein may be implemented in a fully self-contained touch-sensor pad, which outputs fully processed x/y movement and gesture data signals or data commands to a host. In another embodiment, the method and apparatus may be implemented in be a touch-sensor pad, which outputs x/y movement data and also finger presence data to a host, and where the host processes the received data to detect gestures. In another embodiment, the method and apparatus may be implemented in a touch-sensor pad, which outputs raw capacitance data to a host, where the host processes the capacitance data to compensate for quiescent and stray capacitance, and calculates x/y movement and detects gestures by processing the capacitance data. Alternatively, the method and apparatus may be implemented in a touch-sensor pad, which outputs pre-processed capacitance data to a host, where the touchpad processes the capacitance data to compensate for quiescent and stray capacitance, and the host calculates x/y movement and detects gestures from the pre-processed capacitance data.

In one embodiment, the electronic system that includes the embodiments described herein may be implemented in a conventional laptop touch-sensor pad. Alternatively, it may be implemented in a wired or wireless keyboard integrating a touch-sensor pad, which is itself connected to a host. In such an implementation, the processing described above as being performed by the "host" may be performed in part or in whole by the keyboard controller, which may then pass fully processed, pre-processed or unprocessed data to the system host. In another embodiment, the embodiments may be implemented in a mobile handset (e.g., cellular or mobile phone) or other electronic devices where the touch-sensor pad may operate in one of two or more modes. For example, the touch-sensor pad may operate either as a touch-sensor pad for x/y positioning and gesture recognition, or as a keypad or other array of touch-sensor buttons and/or sliders.

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of sensor elements (also referred to as capacitive touch switches) using a current-programmable relaxation oscillator, an analog multiplexer, digital counting functions, and high-level software routines to compensate for environmental and physical sensor element variations. The sensor array may include combinations of independent sensor elements, sliding sensor elements (e.g., touch-sensor slider), and touch-sensor sensor element pads (e.g., touch pad) implemented as a pair of orthogonal sliding sensor elements. The CSR may include physical, electrical, and software components. The physical component may include the physical sensor element itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a sensor element detection decision (also referred to as switch detection decision). For example, in the case of slider sensor elements or X-Y touch-sensor sensor element pads, a calculation for finding position of the conductive object to greater resolution than the physical pitch of the sensor elements may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
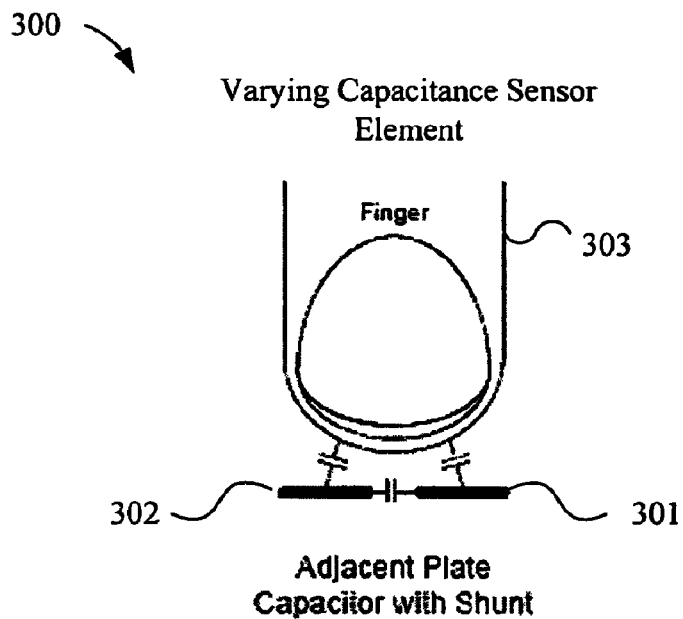
FIG. 3A illustrates a varying capacitance sensor element.

FIG. 3A illustrates a varying capacitance sensor element. In its basic form, a capacitive sensor element 300 is a pair of adjacent plates 301 and 302. There is a small edge-to-edge capacitance Cp, but the intent of sensor element layout is to minimize the base capacitance Cp between these plates. When a conductive object 303 (e.g., finger) is placed in proximity to the two plate 301 and 302, there is a capacitance between one electrode 301 and the conductive object 303 and a similar capacitance between the conductive object 303 and the other electrode 302. The capacitance between the electrodes when no conductive object 303 is present is the base capacitance Cp. This may be stored as a baseline value. There is also a total capacitance (Cp+Cf) on the sensor element 300 when the conductive object 303 is present on the sensor element 300. The baseline capacitance value Cp may be subtracted from the total capacitance when the conductive object 303 is present to determine the change in capacitance (e.g., capacitance variation Cf) when the conductive object 303 is present and when the conductive object 303 is not present on the sensor element. Effectively, the capacitance variation Cf can be measured to determine whether a conductive object 303 is present or not (e.g., sensor activation) on the sensor element 300. Capacitive sensor element 300 may be used in a capacitance sensor array. The capacitance sensor array is a set of capacitors where one side of each is grounded to a system ground. Thus, the active capacitor (as represented in FIG. 3C as capacitor 351) has only one accessible side. The presence of the conductive object 303 increases the capacitance (Cp+Cf) of the sensor element 300 to ground. Determining sensor element activation is then a matter of measuring change in the capacitance (Cf) or capacitance variation. Sensor element 300 is also known as a grounded variable capacitor.

The conductive object 303 in this embodiment has been illustrated as a finger. Alternatively, this technique may be applied to any conductive object, for example, a conductive door switch, position sensor, or conductive pen in a stylus tracking system (e.g., stylus).

Figure 3B:
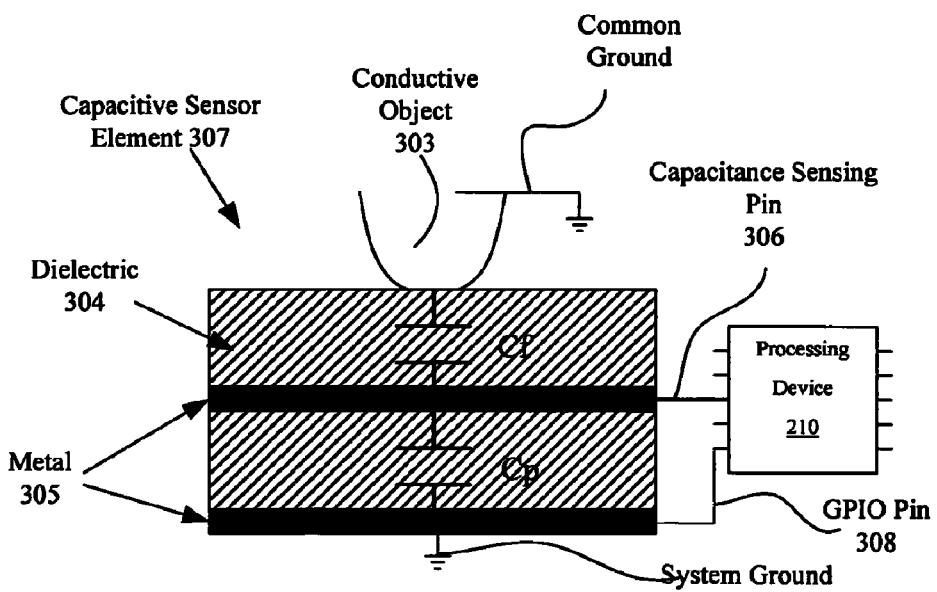
FIG. 3B illustrates one embodiment of a sensing device coupled to a processing device.
Figure 3C:
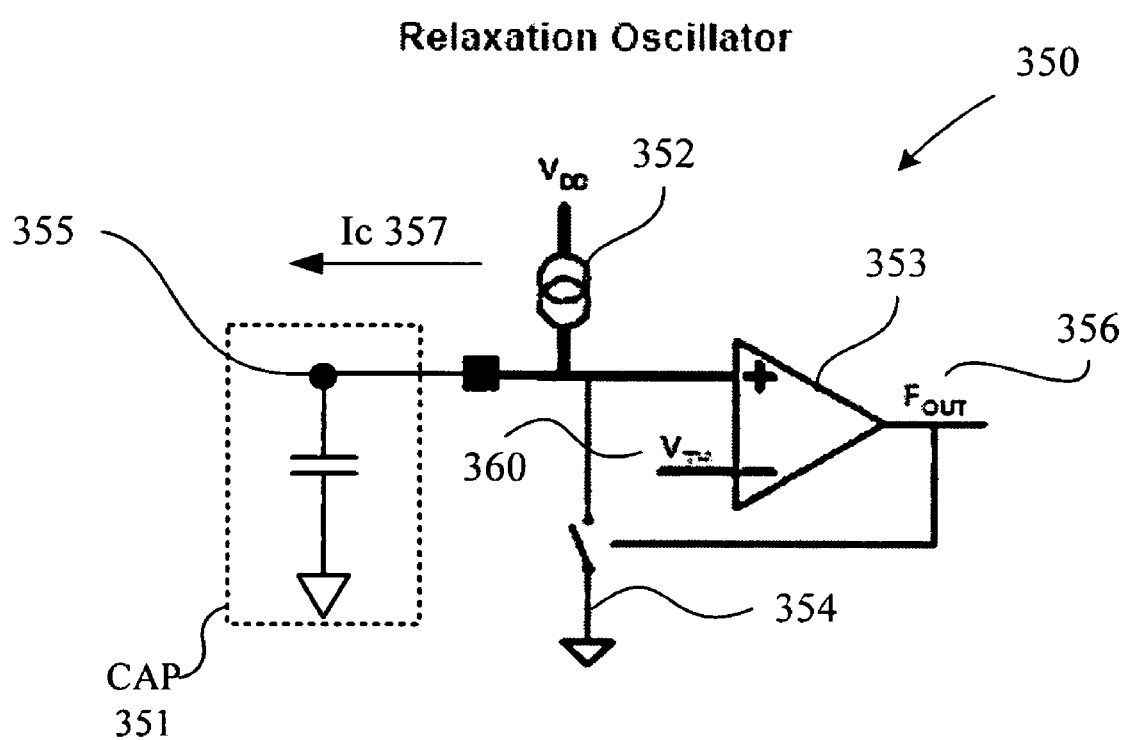
FIG. 3C illustrates one embodiment of a relaxation oscillator.

FIG. 3B illustrates one embodiment of a capacitive sensor element 307 coupled to a processing device 210. Capacitive sensor element 307 illustrates the capacitance as seen by the processing device 210 on the capacitance sensing pin 306. As described above, when a conductive object 303 (e.g., finger) is placed in proximity to one of the metal plates 305, there is a capacitance, Cf, between the metal plate and the conductive object 303 with respect to ground. This ground, however, may be a floating ground. Also, there is a capacitance, Cp, between the two metal plates, with one of the metal plates being ground to a system ground. The ground plate may be coupled to the processing device 210 using GPIO pin 308. In one embodiment, the ground plate may be an adjacent sensor element. Alternatively, the ground plate may be other grounding mechanisms, such as a surrounding ground plane. Accordingly, the processing device 210 can measure the change in capacitance, capacitance variation Cf, as the conductive object is in proximity to the metal plate 305. Above and below the metal plate that is closest to the conductive object 303 is dielectric material 304. The dielectric material 304 above the metal plate 305 can be the overlay, as described in more detail below. The overlay may be non-conductive material used to protect the circuitry to environmental elements and to insulate the user's finger (e.g., conductive object) from the circuitry. Capacitance sensor element 307 may be a sensor element of a touch-sensor pad, a touch-sensor slider, or a touch-sensor button.

FIG. 3C illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array or on a single touch-sensor button. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage, and time for a charging capacitor.

$$CdV = I_C dt \qquad (1)$$

The relaxation oscillator begins by charging the capacitor 351, at a fixed current Ic 357, from a ground potential or zero voltage until the voltage across the capacitor 351 at node 355 reaches a reference voltage or threshold voltage, $V_{TH}$ 360. At the threshold voltage $V_{TH}$ 360, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 351. This sets a practical upper limit to the operating frequency. For example, if capacitance C of the capacitor 351 changes, then $f_{RO}$ changes proportionally according to Equation (1). By comparing $f_{RO}$ of $F_{OUT}$ 356 against the frequency ($f_{REF}$) of a known reference system clock signal (REF CLK), the change in capacitance $\Delta C$ can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference $\Delta f$ between these frequencies. By monitoring $\Delta f$ one can determine whether the capacitance of the capacitor 351 has changed.

In one exemplary embodiment, the relaxation oscillator 350 may be built using a programmable timer (e.g., 555 timer) to implement the comparator 353 and reset switch 354. Alternatively, the relaxation oscillator 350 may be built using other circuiting. Relaxation oscillators are known by those of ordinary skill in the art, and accordingly, additional details regarding their operation have not been included so as to not obscure the present embodiments.

Figure 4:
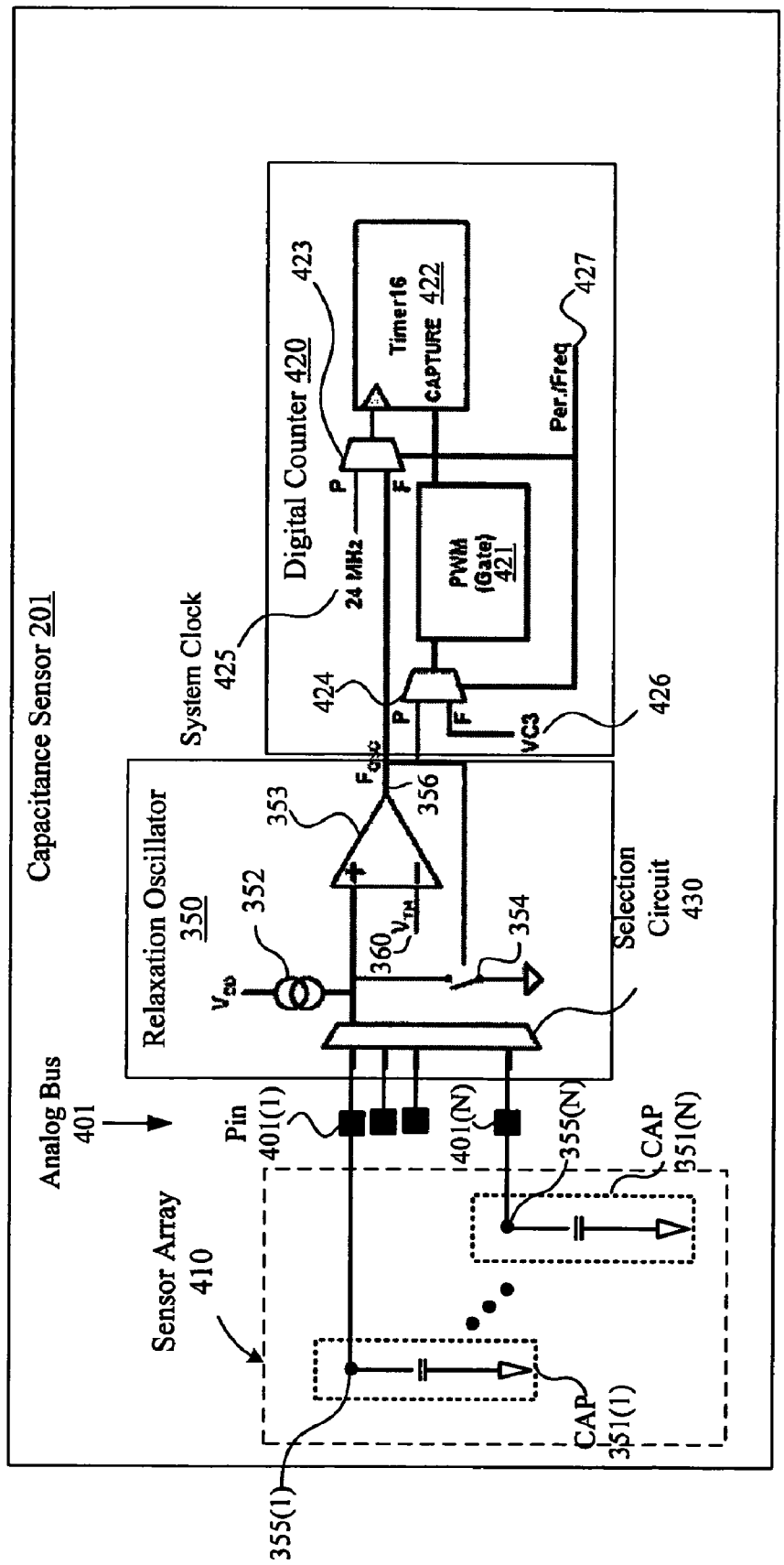
FIG. 4 illustrates a block diagram of one embodiment of a capacitance sensor including a relaxation oscillator and a digital counter.

FIG. 4 illustrates a block diagram of one embodiment of a capacitance sensor including a relaxation oscillator and a digital counter. Capacitance sensor 201 of FIG. 4 includes a sensor array 410 (also known as a switch array), relaxation oscillator 350, and a digital counter 420. Sensor array 410 includes sensor elements 355(1)-355(N), where N is a positive integer value that represents the number of rows (or alternatively columns) of the sensor array 410. Each sensor element is represented as a capacitor, as described above with respect to FIG. 3B. The sensor array 410 is coupled to relaxation oscillator 350 via an analog bus 401 having multiple pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3C, and a selection circuit 430. The selection circuit 430 is coupled to the sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the multiple sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter to measure capacitance on all the sensor elements of the sensor array. Alternatively, capacitance sensor 201 may include multiple relaxation oscillators and digital counters to measure capacitance on the sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having multiple rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As described above with respect to the relaxation oscillator 350, when a finger or conductive object is placed on the sensor element, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the timer 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The timer 422 is read to obtain the number of counts during the gate time. This method works well at low frequencies where the oscillator reset time is small compared to the oscillator period. A pulse width modulator (PWM) 421 is clocked for a fixed period by a derivative of the system clock, VC3 426 (which is a divider from system clock 425, e.g., 24 MHz). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a timer 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As described above, pulse width modulation is a modulation technique that generates variable-length pulses to represent the amplitude of an analog input signal; in this case the relaxation oscillator output signal 356. The output of the PWM 421 enables timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next sensor element (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software loads and the values of the sensor element capacitances. The frequency measurement method has a fixed-sensor element data acquisition rate.

The length of the timer 422 and the detection time required for the sensor element are determined by sensitivity requirements. Small changes in the capacitance on capacitor 351 result in small changes in frequency. In order to find these small changes, it may be necessary to count for a considerable time.

At startup (or boot), the sensor elements (e.g., capacitors 351(1)-(N)) may be scanned and the count values for each sensor element with no activation are stored as a baseline array (Cp). The presence of a finger on the sensor element is determined by the difference in counts between a stored value for no sensor element activation (also referred to as switch activation) and the acquired value with sensor element activation, referred to here as $\Delta n$. The sensitivity of a single sensor element is approximately:

$$\frac{\Delta n}{n} = \frac{Cf}{Cp} \quad (4)$$

The value of $\Delta n$ should be large enough for reasonable resolution and clear indication of sensor element activation. This drives sensor element construction decisions. Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the conductive traces (e.g., sensor elements and/or interconnecting sensor traces) (through the over-lying insulator), the baseline capacitance Cp should be minimized. The baseline capacitance Cp includes the capacitance of the sensor element plus any parasitics, including routing and chip pin capacitance.

In sensor array applications, variations in sensitivity should be minimized. If there are large differences in $\Delta n$, one sensor element may activate at 1.0 cm, while another may not activate until direct contact. This presents a non-ideal user interface device. There are numerous methods for balancing the sensitivity. These may include precisely matching on-board capacitance with PCB trace length modification, adding balance capacitors on each PCB trace, and/or adapting a calibration factor to each sensor element to be applied each time the sensor element is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB, a 1.6 mm, a 0.8 mm, and a 0.4 mm PCBs.

It should be noted that the count window should be long enough for $\Delta n$ to be a "significant number." In one embodiment, the "significant number" can be as little as 10, or alternatively, as much as several hundred. In one exemplary embodiment, where Cf is 1.0% of Cp, and where the sensor element threshold is set at a count value of 20, n is found to be:

$$n = \Delta n \cdot \frac{Cf}{Cp} = 2000 \quad (5)$$

Adding some margin to yield 2500 counts, and running the frequency measurement method at 1.0 MHz, the detection time for the sensor element is 2.5 microseconds. In the frequency measurement method, the frequency difference between a sensor element with and without activation (i.e., CP+CF vs. CP) is approximately:

$$\Delta n = \frac{t_{count} \cdot i_c}{V_{TH}} \frac{Cf}{Cp^2} \quad (6)$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a sensor element with and without activation (i.e., CP+CF vs. CP) is approximately:

$$\Delta n = N_{Periods} \cdot \frac{Cf \cdot V_{TH}}{i_C} \cdot f_{SysClk} \quad (7)$$

The charge currents are typically lower and the period is longer to increase sensitivity, or the number of periods for which $f_{SysClk}$ is counted can be increased. In either method, by matching the static (parasitic) capacitances Cp of the individual sensor elements, the repeatability of detection increases, making all sensor elements work approximately at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the selection circuit 430, multiple sensor elements may be sequentially scanned to provide current to and measure the capacitance from the capacitors (e.g., sensor elements), as described above. In one embodiment, while one sensor element is being measured, the remaining sensor elements are grounded to a system ground using the GPIO port 207. This drive and multiplex arrangement bypasses the existing GPIO to connect the selected pin to an internal analog multiplexer (mux) bus. The capacitor charging current (e.g., current source 352) and reset switch 354 are connected to the analog bus. This may limit the pin-count requirement to simplify the number of sensor elements (e.g., capacitors 351(1)-351(N)) to be addressed. In one exemplary embodiment, no external resistors or capacitors are required inside or outside the processing device 210 to enable operation.

The capacitor charging current for the relaxation oscillator 350 may be generated in a register programmable current output DAC (also known as IDAC). Accordingly, the current source 352 may be a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular sensor array may be determined to some degree by experimentation.

In many capacitive sensor element designs the two "plates" (e.g., 301 and 302) of the sensing capacitor are actually adjacent sensor elements that are electrically isolated (e.g., PCB pads or traces), as indicated in FIG. 3A. Typically, one of these plates is grounded to a system ground. Layouts for touch-sensor slider (e.g., linear slide sensor elements) and touch-sensor pad applications have sensor elements that are immediately adjacent. In this case, all of the sensor elements that are not active are grounded to a system ground through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+(f). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} pF/m \quad (8)$$

The dimensions of equation (8) are in meters. This is a very simple model of the capacitance. The reality is that there are fringing effects that substantially increase the sensor element-to-ground (and PCB trace-to-ground) capacitance.

Sensor element sensitivity (i.e., activation distance) may be increased by one or more of the following: 1) increasing board thickness to increase the distance between the active sensor element and any parasitics; 2) minimizing PCB trace routing underneath sensor elements; 3) utilizing a gridded ground with 50% or less fill if use of a ground plane is absolutely necessary; 4) increasing the spacing between sensor elements and any adjacent ground plane; 5) increasing pad area; 6) decreasing thickness of any insulating overlay; or 7) verifying that there is no air-gap between the sensor element surface and the touching finger.

There is some variation of sensor element sensitivity as a result of environmental factors. A baseline update routine, which compensates for this variation, may be provided in the high-level APIs.

Sliding sensor elements are used for control requiring gradual or discrete adjustments. Examples include a lighting control (dimmer), volume control, graphic equalizer, and speed control. These sensor elements are mechanically adjacent to one another. Activation of one sensor element results in partial activation of physically adjacent sensor elements. The actual position in the sliding sensor element is found by computing the centroid location of the set of sensor elements activated.

In applications for touch-sensor sliders (e.g., sliding sensor elements) and touch-sensor pads it is often necessary to determine finger (or other capacitive object) position to more resolution than the native pitch of the individual sensor elements. The contact area of a finger on a sliding sensor element or a touchpad sensor element is often larger than any single sensor element. In one embodiment, in order to calculate the interpolated position using a centroid, the array is first scanned to verify that a given sensor element location is valid. The requirement is for some number of adjacent sensor element signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \quad (9)$$

The calculated value may be fractional. In order to report the centroid to a specific resolution, for example a range of 0 to 100 for 12 sensor elements, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes two or more PCBs, an adhesive layer, and an overlay. The first PCB may include the sensor array disposed on one or more sides of the first PCB. The touchpad assembly may also include one or more additional PCBs that include the processing device 210 and other electronic components, such as the connector to the host 250. These components, instead of being mounted on a non-sensing side of a PCB that includes the sensor array, as done conventionally, are mounted on the one or more additional PCBs. Alternatively, other multi-layer stack-ups may be used in the touchpad assembly.

The one or more additional PCBs of the second circuit board, which do not include the sensor array, may be made of standard materials, such as FR4 or Kapton™ (e.g., flexible PCB). In either case, the processing device 210 may be attached (e.g., soldered) directly to the one or more additional PCBs. The first circuit board may be made of standard materials, or alternatively, as materials that are cheaper than the standard materials (e.g., FR4 or Kapton™).

The PCB thickness varies depending on multiple variables, including height restrictions and sensitivity requirements. In one embodiment, a second circuit board has a thickness that is at least approximately 0.3 millimeters (mm). Alternatively, the second circuit board may have other thicknesses. In one embodiment, the first circuit board has a thickness that is at least approximately X mm. Alternatively, the first circuit board may have other thicknesses. For example, the sensor element on a PET substrate may be less than approximately 0.1 mm thick. The circuit board with active electronics may be approximately 0.8 mm thick. The PCB length and width is dependent on individual design requirements for the device on which the sensing device is mounted, such as a notebook or mobile handset.

The adhesive layer is directly on top of the PCB sensor array and is used to affix the overlay to the overall touchpad assembly. The adhesive layer may also be disposed on top of the PCB that does not include the sensor array. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or polyester film, such as Mylar™ polyester film. Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern may be disposed to maximize the area covered by conductive material, such as copper, in relation to spaces necessary to define the rows and columns of the sensor array.

Figure 5A:
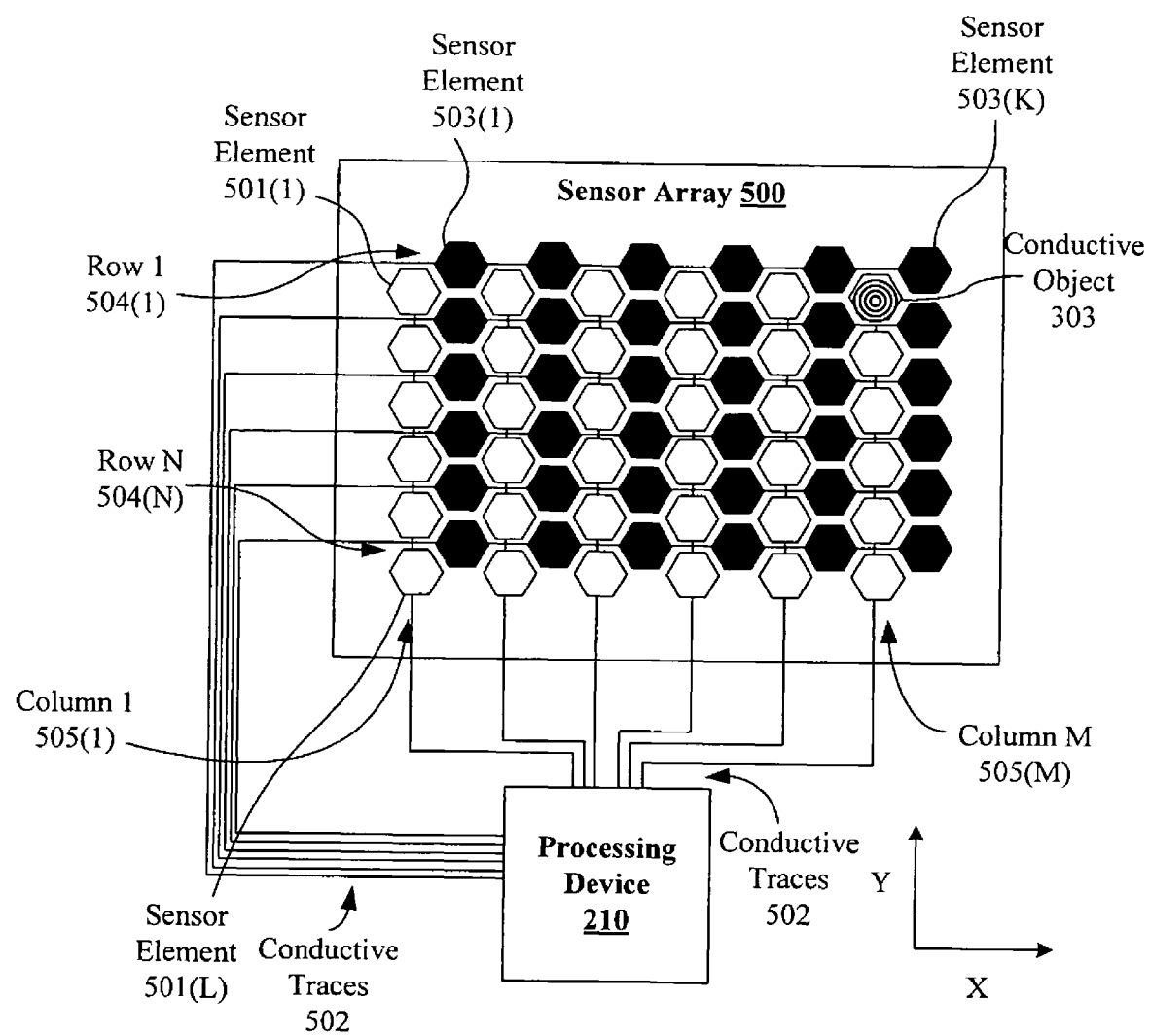
FIG. 5A illustrates a top-side view of one embodiment of a sensor array of sensor elements for detecting a presence of a conductive object on the sensor array of a touch-sensor pad.

FIG. 5A illustrates a top-side view of one embodiment of a sensor array of sensor elements for detecting a presence of a conductive object 303 on the sensor array 500 of a touch-sensor pad. Touch-sensor pad 220 includes a sensor array 500. Sensor array 500 includes rows 504(1)-504(N) and columns 505(1)-505(M), where N is a positive integer value representative of the number of rows and M is a positive integer value representative of the number of columns. Each row includes sensor elements 503(1)-503(K), where K is a positive integer value representative of the number of sensor elements in the row. Each column includes sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
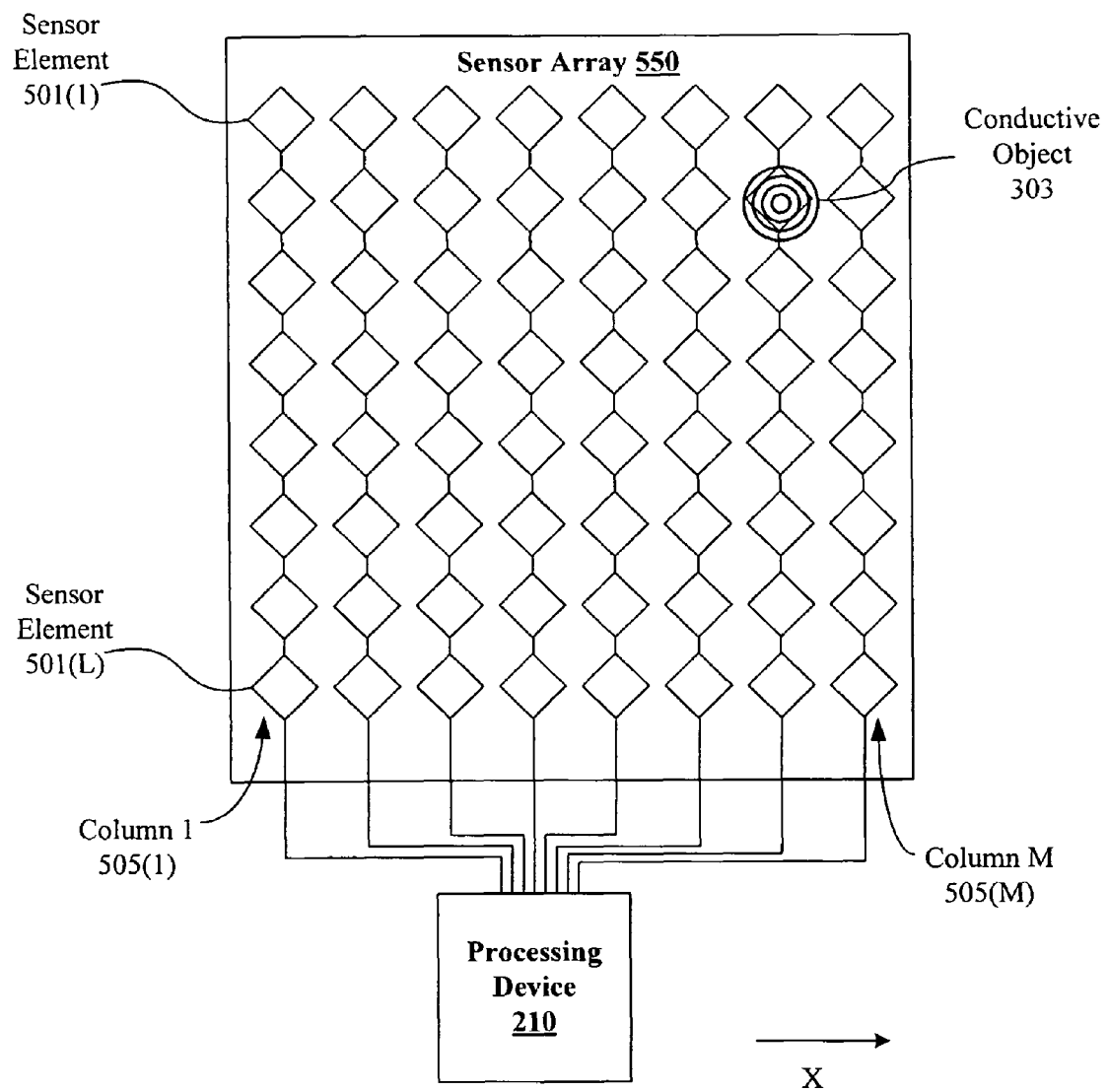
FIG. 5B illustrates a top-side view of one embodiment of a sensor array of sensor elements for detecting a presence of a conductive object on the sensor array of a touch-sensor slider.

FIG. 5B illustrates a top-side view of one embodiment of a sensor array of sensor elements for detecting a presence of a conductive object 303 on the sensor array 550 of a touch-sensor slider. Touch-sensor slider 230 includes a sensor array 550. Sensor array 550 includes columns 504(1)-504(M), where M is a positive integer value representative of the number of columns. Each column includes sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black hexagons in FIG. 5A, and the x-axis sensor elements 501(1)-501(L) are illustrated as white hexagons in FIG. 5A. It should be noted that other shapes may be used for the sensor elements, such as diamonds (as illustrated in FIG. 5B) or the like. In another embodiment, the columns and row may include vertical and horizontal bars (e.g., rectangular shaped bars); however, this design may include additional layers in the PCB to allow the vertical and horizontal bars to be positioned on the PCB so that they are not in contact with one another.

Figure 5C:
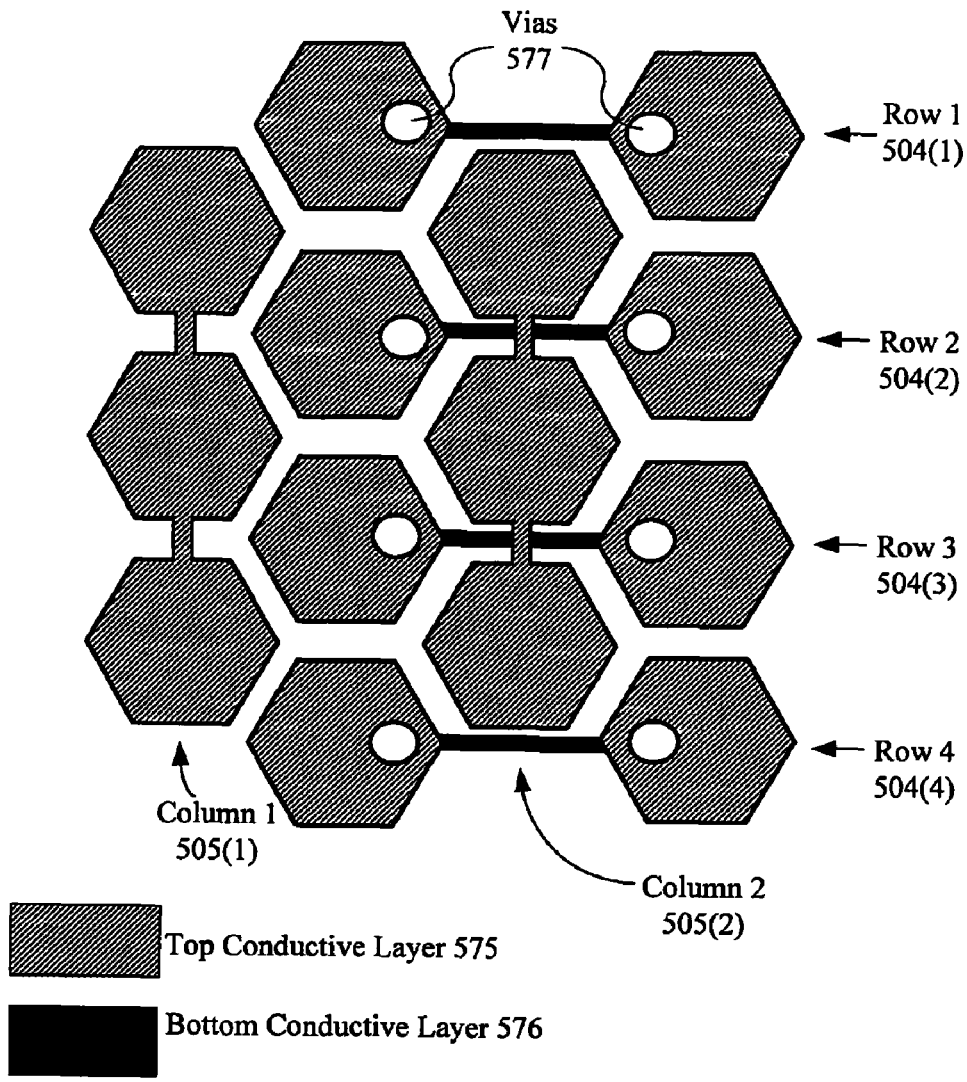
FIG. 5C illustrates a top-side view of one embodiment of a two-layer touch-sensor pad.
Figure 5D:
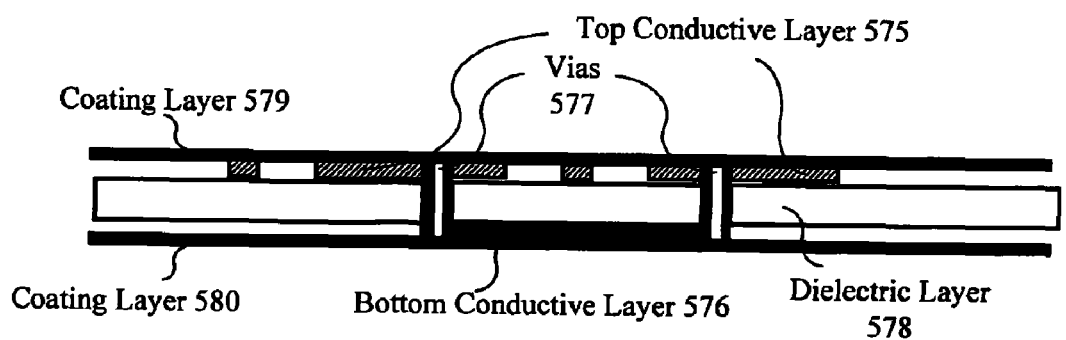
FIG. 5D illustrates a cross-sectional view of one embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed hexagonal sensor elements and connections. The hexagonal sensor elements of each column, in effect, form a chain of elements. The sensor elements of the second column 501(2) are similarly connected in the top conductive layer 575. The sensor elements of the first row 504(1) are connected together in the bottom conductive layer 576 using vias 577, illustrated as black hexagonal sensor elements and connections. The hexagonal sensor elements of each row, in effect, form a chain of elements. The sensor elements of the second, third, and fourth rows 504(2)-504(4) are similarly connected in the bottom conductive layer 576. It should be noted that other shapes may be used for the sensor elements, such as diamonds (as illustrated in FIG. 5B) or the like.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 580 are applied to the surfaces opposite to the surfaces that are coupled to the dielectric layer 578 on both the top and bottom conductive layers 575 and 576.

It should be noted that the space between coating layers 579 and 580 and dielectric layer 578, which does not include any conductive material, may be filled with the same material as the coating layers or dielectric layer. Alternatively, it may be filled with other materials.

It should be noted that the present embodiments are not be limited to connecting the sensor elements of the rows using vias to the bottom conductive layer 576, but may include connecting the sensor elements of the columns using vias to the bottom conductive layer 576. Furthermore, the present embodiments are not limited two-layer configurations, but may include disposing the sensor elements on multiple layers, such as three- or four-layer configurations. In another embodiment, the present embodiments may be implemented in a 1-layer configuration.

When pins are not being sensed (only one pin is sensed at a time), they are routed to ground. By surrounding the sensing device (e.g., touch-sensor pad) with a ground plane, the exterior elements have the same fringe capacitance to ground as the interior elements. Alternatively, the individual sensor elements may be surrounded by a ground plane.

In one embodiment, an IC including the processing device 210 may be directly placed on either side of the second circuit board, which does not include the sensor array. This placement does not necessary have to be in the center. The processing device IC is not required to have a specific set of dimensions for a touch-sensor pad, nor a certain number of pins. Alternatively, the IC may be placed somewhere external to the second circuit board.

Figure 6:
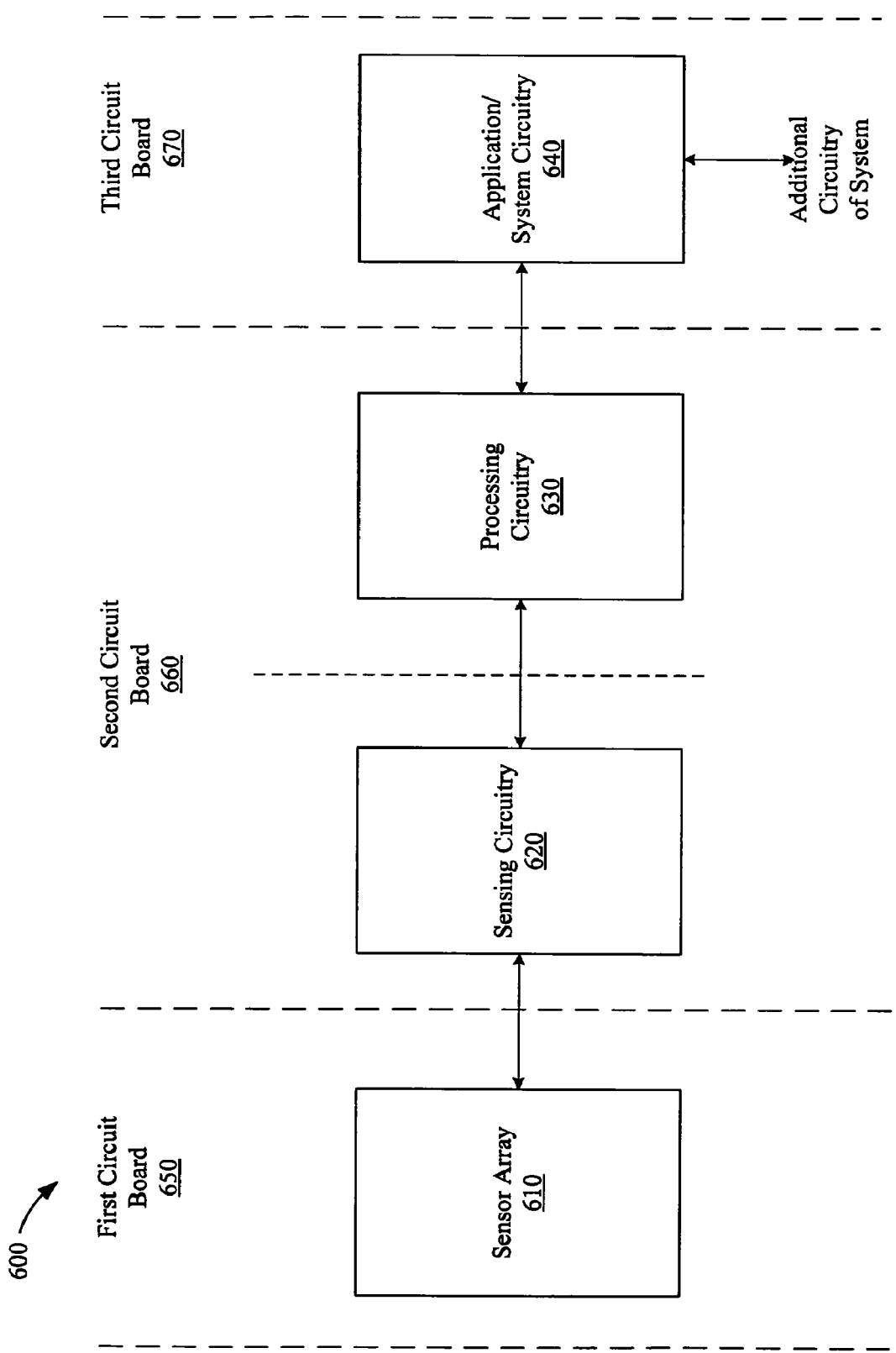
FIG. 6 illustrates a block diagram of one embodiment of an electronic system having two or more circuit boards for detecting the presence of a conductive object on a sensor array on one of the two or more circuit boards.

FIG. 6 illustrates a block diagram of one embodiment of an electronic system having two or more circuit boards for detecting the presence of a conductive object on a sensor array on one of the two or more circuit boards. Electronic system 600 includes a sensor array 610, sensing circuitry 620, processing circuitry 630, and application/system circuitry 640. The electronic system 600 may be implemented in three or more different circuit boards. In this embodiment, the sensor array 610 is implemented in a first circuit board 650, the sensing circuitry 620 and processing circuitry 630 are implemented in a second circuit board 660, and the application/system circuitry 640 is implemented in a third circuit board 670.

Sensor array 610 may be similar to the sensor array 410, as described with respect to FIGS. 4, 5A-5D. The sensor array 610 may be one-dimensional, or alternatively, multi-dimensional. It should also be noted that the embodiments described herein may also be applied to one or more touch-sensor buttons.

In one embodiment, the sensing circuitry 620, which is disposed on the second circuit board 660, is configured to measure capacitance on the sensor array 610 of the first circuit board 650. The sensing circuitry 620 may include one or more capacitance sensors, as described above with respect to FIGS. 2 and 4. As previously described, the capacitance sensor may include analog I/O for coupling to an external component, such as a sensor element of the sensor array 610. In one embodiment, the one or more capacitance sensors may each be a capacitive switch relaxation oscillator (CSR), as described in more detail above. Alternatively, the one or more capacitance sensors may be other circuits for measuring capacitance, such as current versus voltage phase shift measurement, resistor-capacitor charge timing, capacitive bridge divider, charge transfer, or the like.

In another embodiment, descriptions of the sensing circuitry 620 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the sensing circuitry 620.

In one embodiment, the sensing circuitry 620 includes a selection circuit, such as the selection circuit 430 (e.g., multiplexer array) described with respect to FIG. 4. The selection circuit 430 may be configured to sequentially select a sensor element of the multiple sensor elements to provide the charge current and to measure the capacitance of each sensor element. In another embodiment, the selection circuit may be configured to simultaneously scan the sensor elements, as opposed to being configured to sequentially scan the sensor elements as described above. For example, the sensing device may include a sensor array (e.g., 610) having multiple rows and columns. The rows may be scanned simultaneously, and the columns may be scanned simultaneously. In one exemplary embodiment, the selection circuit is a multiplexer array of a relaxation oscillator. Alternatively, selection circuit may be other circuitry outside the relaxation oscillator, or even outside the capacitance sensor to select the sensor element to be measured.

In one embodiment, the sensing circuitry 620 includes a digital counter, such as the digital counter 420. The digital counter may be configured to receive the output of the capacitance sensor, such as a relaxation oscillator. The digital counter may be configured to count at least one of a frequency or a period of the relaxation oscillator. Alternatively, the digital counter may include circuitry for digitizing the capacitance measured on the sensor array 610.

The sensing circuitry 620 may include one relaxation oscillator and digital counter for the sensor elements of the sensor array 610. Alternatively, the sensing circuitry 620 may include multiple relaxation oscillators and digital counters to measure capacitance on the sensor elements of the sensor array 610. The sensing circuitry 620 may also include circuitry for grounding the sensor elements of the sensor array 610 that are not being measured.

The processing circuitry 630, which is disposed on the second circuit board 660, is configured to process the measured capacitance by the sensing circuitry 620. The measured capacitance may be used to determine position (e.g., absolute or relative position) of the conductive object on the sensing device, switch activation or button presses (e.g., whether a defined area on the sensing device has been pressed by the conductive object), recognition of gestures (e.g., tap, double-tap, push, hop, and zigzag gestures, or the like), or the like.

The application/system circuitry 640, which is disposed on the third circuit board 670, is configured to use the processed determinations made by the processing circuitry 630 for an application. The application/system circuitry 640 may also be configured to perform similar operations as the processing circuitry 630. The application/system circuitry 640 may be implemented on the host, such as host computer 250, as described above. The application/system circuitry 640 may also be implemented in an embedded controller, such as embedded controller 260, as described above. The application/system circuitry 640 may also be coupled to additional circuitry of the system, such as peripherals to the host.

In one embodiment, the second circuit board 660 includes the processing device 210, which incorporates the sensing circuitry 620 and the processing circuitry 630. The processing device 210 may be mounted to the substrate of the second circuit board 660. The processing device 210 may be, for example, a Programmable System on a Chip (PSoC™) processing device, manufactured by Cypress Semiconductor Corporation, San Jose, Calif. Alternatively, the sensing circuitry 620 and the processing circuitry may be implemented in one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like.

In another embodiment, the sensing circuitry 620 and processing circuitry 630 are implemented on two or more separate circuit boards. For example, the sensing circuitry 620 may be implemented on one circuit board, and the processing circuitry 630 may be implemented on another circuit board, both of which are different circuit boards than the first circuit board 650, which includes the sensor array 610. In another embodiment, the processing circuitry 630 is implemented on the third circuit board 670, which contains the application/system circuitry 640. In another embodiment, the sensing circuitry 620, the processing circuitry 630, and the application/system circuitry 640 are implemented in a single circuit board (e.g., second or third circuit boards 660 or 670).

Figure 7:
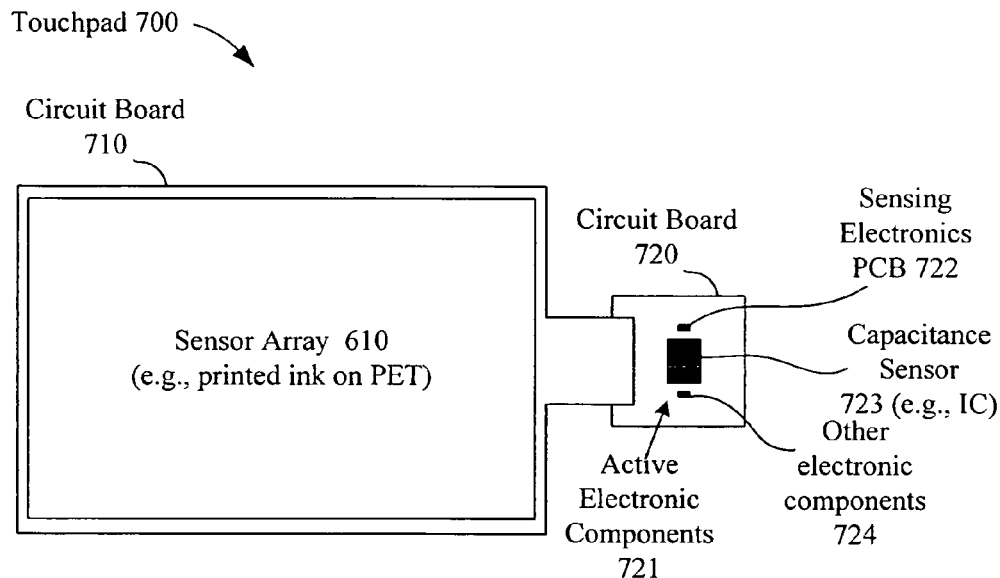
FIG. 7 illustrates one embodiment of a touchpad having a sensor array on a first circuit board and active electronics on a second circuit board.

FIG. 7 illustrates one embodiment of a touchpad having a sensor array on a first circuit board and active electronics on a second circuit board. Touchpad 700 includes a first circuit board 710 coupled to a second circuit board 720. Sensor array 610 may be implemented on the circuit board 710. In one embodiment, the sensor array 610 includes conductive material (e.g., for the sensor elements and/or interconnecting sensor traces of the sensor array 610) disposed on a non-conductive substrate, also referred to herein as the sensor array substrate. For example, the sensor array 610 may be printed ink on a polymer film substrate, such as PET. Alternatively, other conductive materials may be used for the sensor elements and/or interconnecting sensor traces of the sensor array 610, and other materials for the non-conductive substrate. The sensor array 610 may be a touchpad sensing area. Alternatively, the sensor array 610 may be a slider sensing area, a touch-button sensing area, or the like.

Coupled to the first circuit board 710 is an additional circuit board, circuit board 720. The second circuit board 720 includes one or more substrates (also referred to herein as PCB substrate), on which the active electronic components 721 may be disposed (e.g., printed, mounted, or the like). The active electronic components 721 include the sensing circuitry 620, as described above. Alternatively, the active electronic components 721 include the sensing circuitry 620, the processing circuitry 630, the application/system circuitry 640, or any combination thereof. In one embodiment, the active electronic components 721 include sensing electronics PCB 722 (which may be printed or mounted on the substrate of the second circuit board), a capacitance sensor 723 (e.g., IC that includes the one or more capacitance sensors described above), and other electronic components 724 (e.g., power circuits, grounding circuits, I/O circuits, or the like) mounted to the substrate of the second circuit board 720. Alternatively, the active electronic components 721 may reside on a common carrier substrate, which is mounted to the substrate of the second circuit board 720, such as, for example, an IC die substrate, a multi-chip module substrate, or the like. In another embodiment, the sensing circuitry 620 (or alternatively, both the sensing circuitry 620 and the processing circuitry) may be integrated into the second circuit board 720, such as PCB, instead of being mounted to the substrate of the circuit board.

Figure 8:
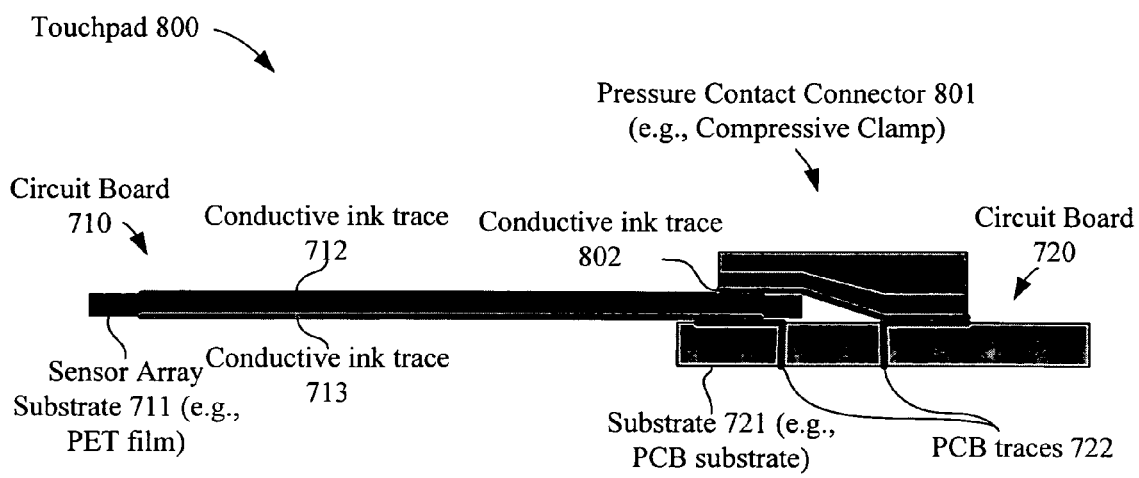
FIG. 8 illustrates a cross-sectional view of one embodiment of a touchpad having two circuit boards.

FIG. 8 illustrates a cross-sectional view of one embodiment of a touchpad having two circuit boards. Touchpad 800 includes a first circuit board 710 and a second circuit board 720. Circuit board 710 includes a sensor array substrate 711 (e.g., PET film), conductive ink traces 712 and 713. Circuit board 720 includes a substrate 721 (e.g., PCB substrate). The first circuit board 710 is coupled to the second circuit board 720 using a pressure contact connector 801. In one embodiment, the pressure contact connector 801 is a compressive clamp. Alternatively, the pressure contact connector may be a fastener, a screw, an elastomer and screw, anisotropic conductive adhesive, or the like. In one embodiment, an electrical connection can be made between the conductive ink traces 712 and 713 of the sensor array 610 and the circuitry disposed on the substrate 721 using a conductive ink trace 802 and PCB traces 722. When using a compressive clamp for the pressure contact connector 801, the conductive ink trace 713 on the lower side of the sensor array substrate 711 (e.g., polymer film substrate) may be disposed to be in direct contact with contacts of the PCB (e.g., PCB pads, or the like), such as PCB traces 722. The conductive ink trace 712 on the upper side of the sensor array substrate 711 may connect indirectly to the PCB traces 722 via conductive ink trace 802 (e.g., a small piece of film with conductive ink on the lower side). In order to maintain the electrical connection between the contacts of the circuit boards 710 and 720, the pressure contact connector 801 (e.g., compressive clamp) may be disposed on the connection. The pressure contact connector 801 may include compressive material, a housing, and a fastener. Alternatively, other types of pressure contact connectors may be used to make an electrical connection between the contacts of the circuit boards 710 and 720.

In another embodiment, anisotropic conductive adhesive may be used in place of the pressure contact connector to make and maintain the electrical connection between the conductive ink traces 713 and 712 of the lower and upper sides of the sensor array substrate 711 (e.g., polymer film substrate) and the contacts of the PCB substrate, PCB traces 722. Alternatively, other coupling mechanisms and methods known by those of ordinary skill in the art may be used.

The conductive ink traces 712 and 713 may be the conductive material that makes up the sensor elements and/or the interconnecting sensor traces of the sensor array 610. In this embodiment, conductive ink trace 712 is disposed on one side of the sensor array substrate 711, and the conductive ink trace 713 is disposed on the other side of the sensor array substrate 711 in a two-sided circuit board configuration. In the two-sided circuit board configuration, a first set of sensor elements (e.g., the rows or columns of the sensor array 610) and interconnecting sensor traces are disposed on a first side of the sensor array substrate 711 and a second set of sensor elements (e.g., the columns or rows of the sensor array 610) and interconnecting sensor traces are disposed on a second side of the sensor array substrate 711. Alternatively, other configurations of the sensor array 610 are possible, such as a single-sided circuit board, where all the sensor elements are disposed on one side of the sensor array substrate 711, or a two-sided circuit board, where all the sensor elements are disposed on one side of the sensor array substrate 711 and the interconnecting sensor traces for one of the sets of sensor elements are disposed on a second side of the sensor array substrate 711, making electrical contact with the one set of sensor elements using vias (e.g., like the vias illustrated in FIG. 5D).

In another embodiment, a pair of substrates may be used for the sensor array substrate, where the conductive ink is printed on one substrate facing the side of the other substrate that is unprinted. In another embodiment, the pair of substrates may be separated by an insulating material with no conductive traces printed on it.

Figure 9A:
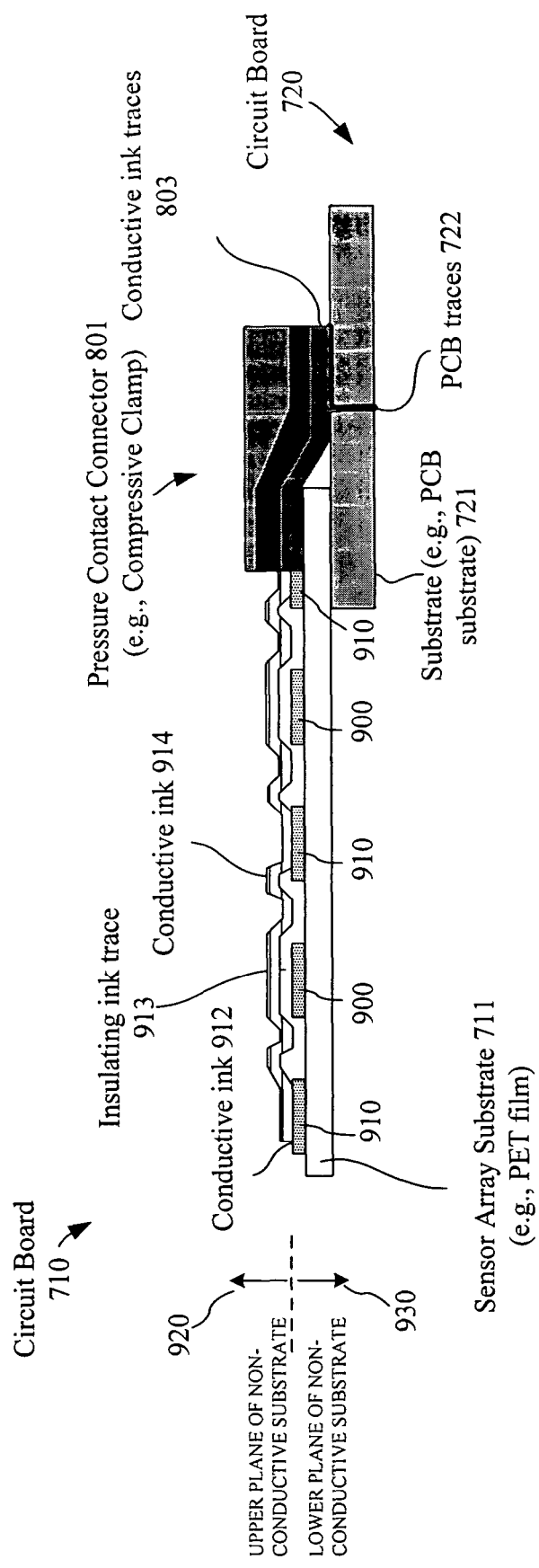
FIG. 9A illustrates a cross-sectional view of one embodiment of a sensor array of a one-layer circuit board coupled to another circuit board.

FIG. 9A illustrates a cross-sectional view of one embodiment of a sensor array 610 of a one-layer circuit board 710 coupled to another circuit board 720. Circuit board 710 includes a sensor array 610 disposed on one side of the sensor array substrate 711. A first set of the sensor elements 900 and interconnecting and traces are disposed on a lower plane 930 of one side of the sensor array substrate 711 using conductive ink 912. A second set of sensor elements 910 are also disposed on the same plane 930 of the one side of the sensor arrays substrate 711 using conductive ink 912. Next, an insulating ink trace 913 is disposed on the first set of sensor elements 900 and interconnecting sensor traces in the lower and upper planes 930 and 920. Next, a conductive ink trace 914 is disposed to form interconnecting sensor traces for the second set of sensor elements 910 in the upper plane of the sensor array substrate 711. The interconnecting sensor traces of the second set of sensor elements 910 do not contact the first set of sensor elements 900 and their interconnecting sensor traces because of the insulating trace 913. The interconnecting sensor traces of the first set of sensor elements 900 are disposed on a substantially different plane (e.g., upper plane 920) than the interconnecting sensor traces of the second set of sensor element 910 (e.g., lower plane 930). Although some portion of interconnecting sensor traces of the second set of sensor elements 910 may dip into the lower plane 930 (otherwise occupied by the insulating trace 913) from the upper plane 920, the interconnecting sensor traces of the second set of sensor elements 910 cannot reside in the same area of the lower plane 930 occupied by the sensor elements 910 and their corresponding interconnected traces.

Similar mechanisms as describe above with respect to FIG. 8 can be used to couple the first circuit board 710 and the second circuit board 720, such as the pressure contact connector 801 as illustrated in FIG. 9A. It should be noted that both the sets of sensor elements 900 and 910 and their interconnecting sensor traces are electrically coupled to the PCB traces 722 of the substrate 721, although FIG. 9A only illustrates how the conductive ink 912 is coupled to the PCB trace 722 via conductive ink trace 803 (e.g., a small piece of film with conductive ink on the lower side). Alternatively, other coupling mechanisms and methods known by those of ordinary skill in the art may be used.

Figure 9B:
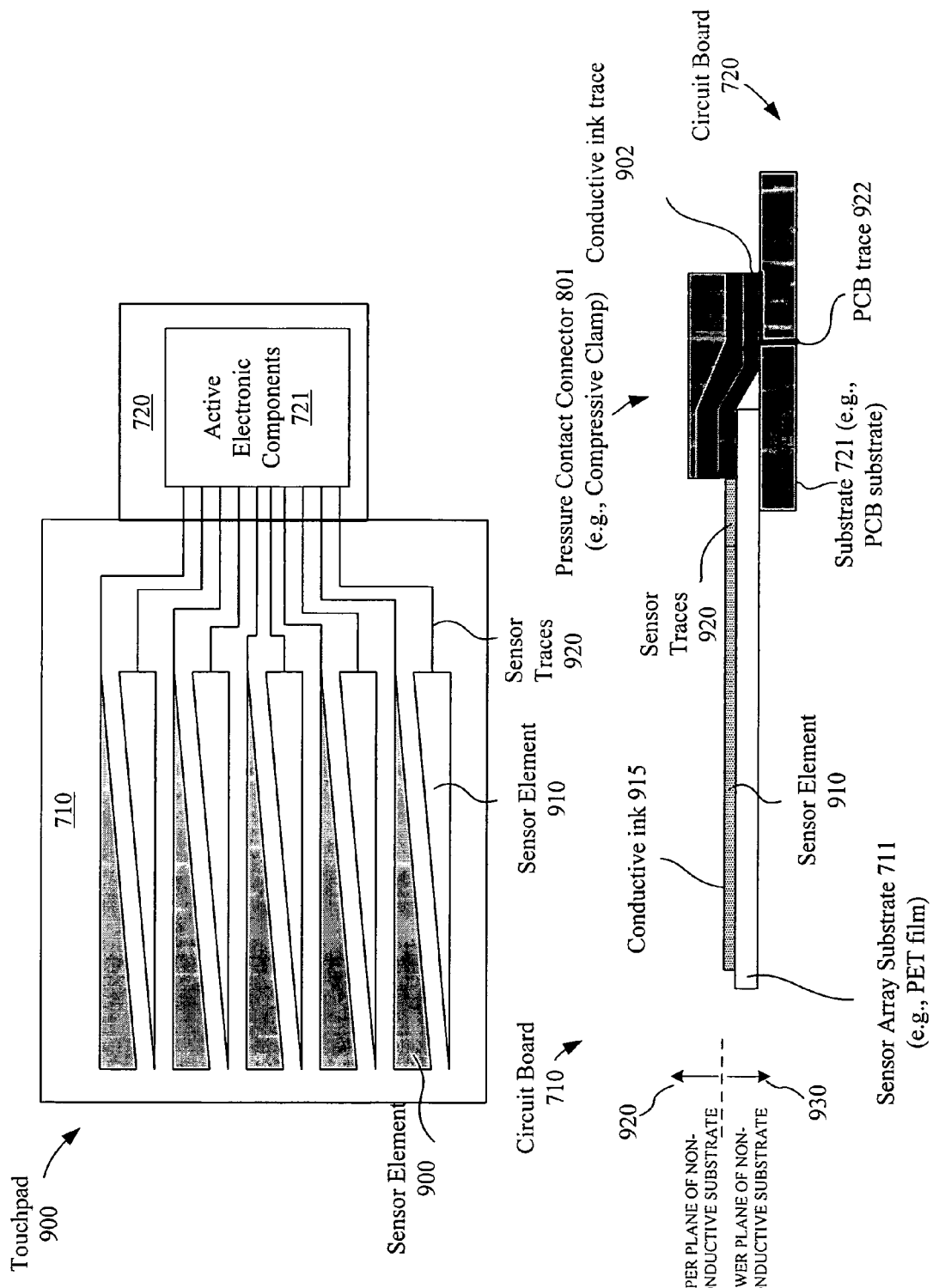
FIG. 9B illustrates top-side and cross-sectional views of one embodiment of a single-layer touch-sensor device with tapered sensor elements.

FIG. 9B illustrates top-side and cross-sectional views of one embodiment of a single-layer touchpad with tapered sensor elements. Touchpad 900 includes a first circuit board 710 and a second circuit board. The second circuit board 720 includes the active electronic components 721 disposed on the substrate 721, as described above. The second circuit board 720 is electrically connected to the first circuit board 710 using the PCB trace 922 and conductive ink trace 920 and the pressure contact connector 801 (e.g., compressive clamp), similar to the PCB traces 722, conductive ink trace 802, and pressure contact connector 801 of FIG. 8. In another embodiment, the first and second circuit boards 710 and 720 are coupled using other connecting mechanisms, as described herein.

The first circuit board 710 of FIG. 9B includes one or more sensor elements 900 and 910 disposed on a single-layer, non-conductive substrate, sensor array substrate 711, where one or more sensor traces 820 lie substantially on the same plane as one or more sensor elements 900 and 910. The structure of the sensor elements 900 and 910 in FIG. 9B may be referred to as tapered sensor elements. Alternatively, the tapered sensor elements may be used in other types of touch-sensing devices, for example, a linear touch-sensor slider, a touch-sensor button, or the like.

The sensor elements 900 and 910 may be the same material as the sensor traces 920, and may be one continuous piece of conductive material. Since the sensor elements 900 and 910 and the sensor traces 920 may be the same continuous piece of conductive material, the sensor elements 900 and 910 may also be referred to as sensor traces.

FIG. 9B illustrates interleaved conductive sensor elements 900 and 910 across a touchpad surface, where each conductive sensor element has a first end and a second end. The width of the first end is larger than the width of the second end. For example, sensor element 900 has one end that is wider than the other end of the sensor element 900, and the sensor element 910 has one end that is wider than the other end of the sensor element 910. The sensor elements 900 and 910 are interleaved (e.g., alternated) such that the wider ends of the sensor elements 900 are disposed interleaved with the narrower ends of the sensor elements 910.

Sensor traces 920 connect the tapered sensor elements 900 and 910 to the active electronic components 721 of the second circuit board 720 on one side of a non-conductive substrate, sensor array substrate 711. Due to the structure of the tapered sensor elements 900 and 910 and the layout of the sensor traces 920, as illustrated in FIG. 920, sensor traces 920 do not need to intersect with each other to connect to active electronic components 721 of the second circuit board 720. As such, a single-type of sensor trace may be used to connect tapered sensor elements 900 and 910 to the active electronic components 721. For example, conductive material, such as conductive ink (e.g., conductive ink 915), may be used for the sensor elements 900 and 910 and sensor traces 920 that are disposed onto the non-conductive substrate. The sensor traces 920 lie substantially on the same plane (e.g., lower plane 930) as the sensor elements 900 and 910 since the structure of the tapered sensor element does not require more than one type of sensor trace to connect sensor elements 900 and 910 to active electronic components 721. It should also be noted that the sensor elements 900 and 910 and sensor traces 920 may include similar or dissimilar conductive material. In another embodiment, the sensor elements 900 and 910 may be sensor traces themselves, and are directly coupled to the active electronic components 721 without the use of any additional conductive traces (e.g., the conductive ink 915 may be the same for sensor element 910, sensor trace 920, and conductive ink trace 920). In effect, the sensor elements 900 and 910 and the sensor traces 920 are the same conductive sensor elements.

In one embodiment, the sensor traces are printed on the back side of the overlay (e.g., Mylar™ overlay). Alternatively, the sensor traces may be disposed on the circuit board.

Figure 9C:
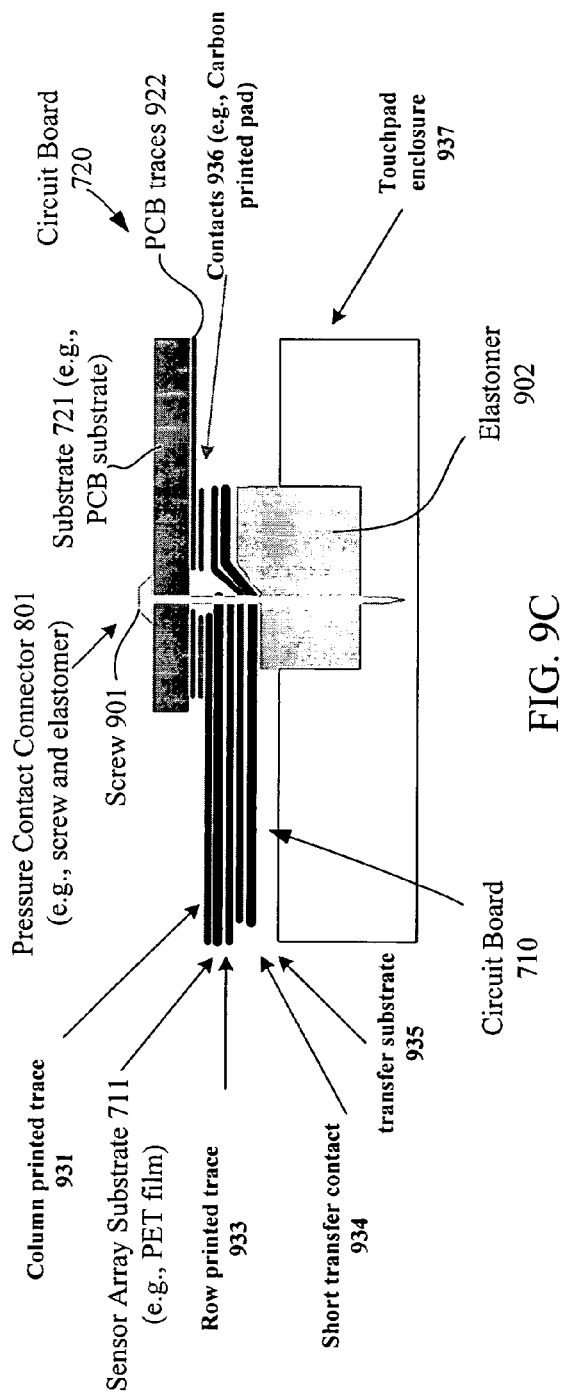
FIG. 9C illustrates a cross-sectional view of another embodiment of two circuit boards of a touchpad assembly coupled together using an elastomer and a screw.

FIG. 9C illustrates a cross-sectional view of another embodiment of two circuit boards 701 and 702 of a touchpad assembly coupled together using an elastomer 902 and a screw 901. A non-conducting rubber elastomer 902 is situated in a groove in the touchpad enclosure 937, and the sheets (e.g., layers of the first circuit board 710) are laid over the elastomer 902 (with the contacts on the lower sheet facing upwards). In particular, column traces 931 and row traces 933 are printed on opposite sides of the sensor array substrate 711, as described above. Similarly, short transfer contacts 934 are printed on a second substrate, transfer substrate 935. The short transfer contacts 934 are disposed to make contact with the row printed traces 933 and the PCB traces 922 that are disposed on the second circuit board 720. The transfer substrate 935 is disposed on the elastomer 902 and protects the short transfer contacts 934 from the elastomer 902.

The second circuit board 720 is disposed so that the contacts 936 of the second circuit board 720 (e.g., carbon-printed contacts) are facing down, making contact with the contacts of the first circuit board 710. The contacts 936 of the second circuit board make contact with the column printed traces 931 and the short transfer contact 934, which is coupled to the row printed traces 933. The second circuit board 720 is screwed down with a screw 901 into the touchpad enclosure 937. By screwing down the second circuit board 720 to the touchpad enclosure 937, the elastomer 902 is under compression, making a pressure contact between the contacts of the first and second circuit boards 710 and 720.

Figure 9D:
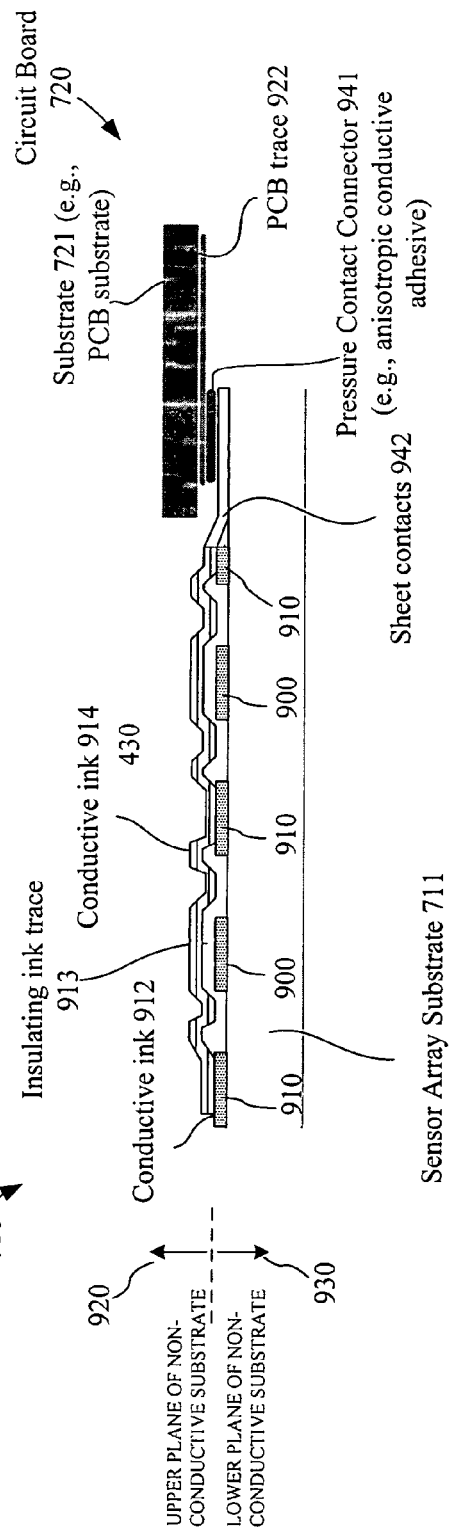
FIG. 9D illustrates a cross-sectional view of another embodiment of two circuit boards of a touchpad assembly coupled together using an anisotropic conductive adhesive.

FIG. 9D illustrates a cross-sectional view of another embodiment of two circuit boards 710 and 720 of a touchpad assembly coupled together using an anisotropic conductive adhesive 941. Contact between the contacts of the second circuit board 720 (e.g., PCB traces 922) and the contacts 942 (e.g., sheet contacts) of the first circuit board 710 are made disposing an anisotropic conductive adhesive 941 disposed between contacts of the first and second circuit boards 710 and 720. In this embodiment, the anisotropic conductive adhesive 941 is used to couple the one-layer circuit board 710 and the second circuit board 720 of FIG. 9A. Alternatively, multi-layer circuit boards may be coupled to the second circuit board 720 using the anisotropic conductive adhesive 941. Anisotropic conductive adhesives only conduct in one direction, and effectively, behave like a connector in one direction (e.g., up/down), but not in the other directions (e.g., side/side and in/out). Anisotropic conductive adhesives are known by those of ordinary skill in the art, and accordingly, additional details regarding them have not been disclosed.

The embodiments of illustrated in FIGS. 7, 8, and 9A-9D illustrate the sensor array substrate 711 of the first circuit board 710 and the substrate 721 of the second circuit board 720 as being in the same plane as each other, or in planes that are substantially parallel to each other. Alternatively, the sensor array substrate 711 of the first circuit board 710 and the substrate 721 of the second circuit board 720 may be implemented in other configurations, such as the embodiments described below with respect to FIGS. 10A-10C, or the like.

In another embodiment, a single sheet of material may be used for the one or more substrates, and may include both a sensor array and a keyboard matrix. Alternatively, one or more substrates may be used in an electronic device that includes both a touchpad and a keyboard matrix on the first circuit board.

Figure 10A:
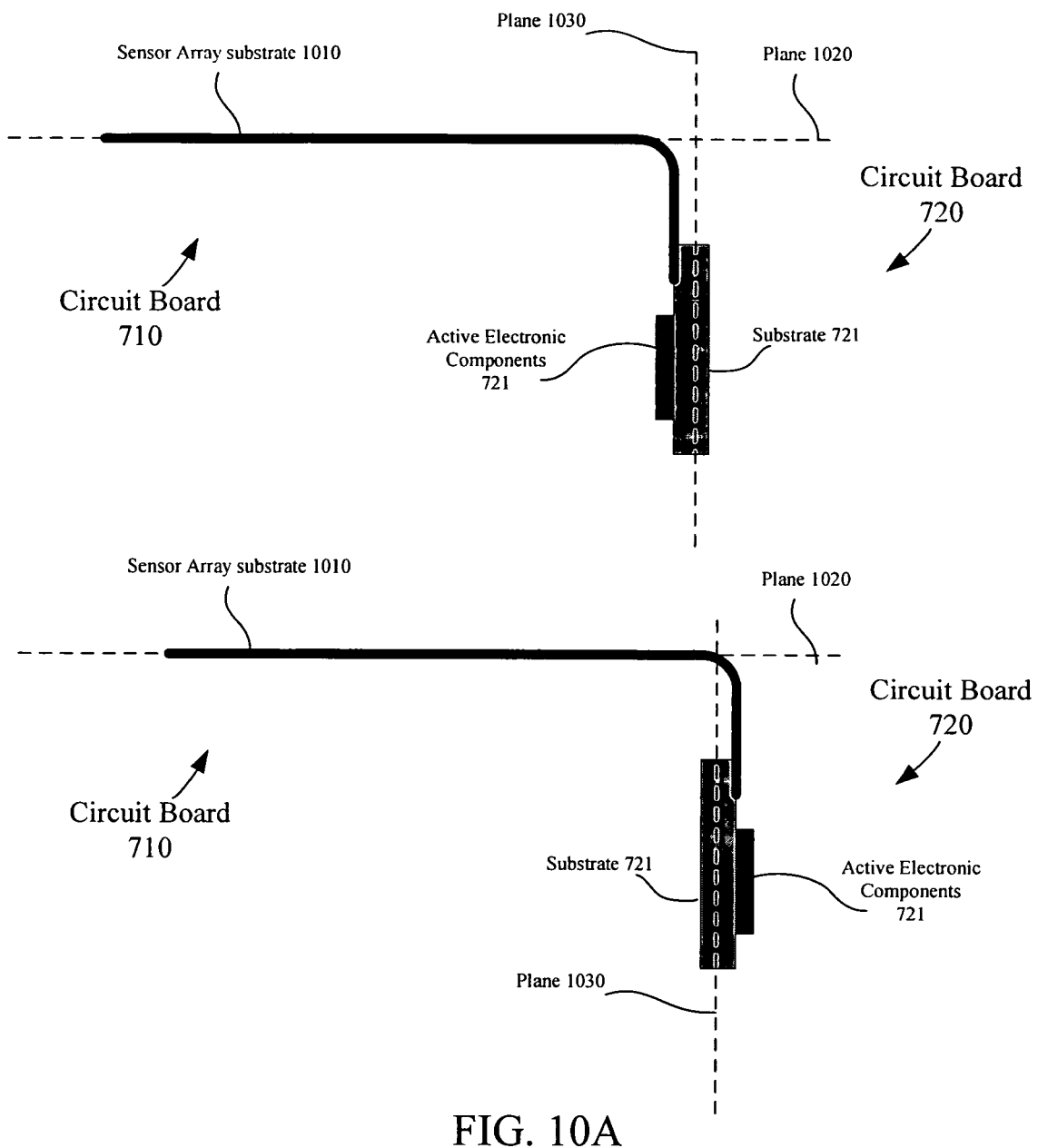
FIG. 10A illustrates cross-sectional views of two embodiments of a sensor array substrate of a first circuit board coupled to a substrate of a second circuit board that is substantially perpendicular to the plane of the first circuit board.

FIG. 10A illustrates cross-sectional views of two embodiments of a sensor array substrate 1010 of a first circuit board 710 coupled to a substrate 721 of a second circuit board 720 in a plane 1030 that is substantially perpendicular to the plane 1020 of the first circuit board 710. Sensor array substrate 1010 of the first circuit board 710 is coupled to the substrate 721 of the second circuit board 720 using the embodiments described herein. Active electronic components 721 are disposed on the substrate 721, as described above. In one embodiment, the active electronic components 721 include the processing device 210, which includes the sensing circuitry 620 and the processing circuitry 630, as described above. In another embodiment, the active electronic components 721 include only the sensing circuitry 620.

As described above, the first circuit board 710, including the sensor array substrates 1010, and the second circuit board 720, including the substrate 721, are disposed in a plane 1030 such that the second circuit board 720 is substantially perpendicular to the plane 1020 of the first circuit board 721. In one embodiment, the sensor array substrate 1010 includes a bend in the substrate to form an L-shaped bend. In one embodiment, the bend has an angle of approximately 90°. Alternatively, other angles may be used. In another embodiment, the second circuit board 720 may be disposed in another plane that is non-parallel to the plane 1020 of the first circuit board 710. As illustrated in the two embodiments of FIG. 10A, the second circuit board 720 may be coupled to either side of the sensor array substrate 1010.

Figure 10B:
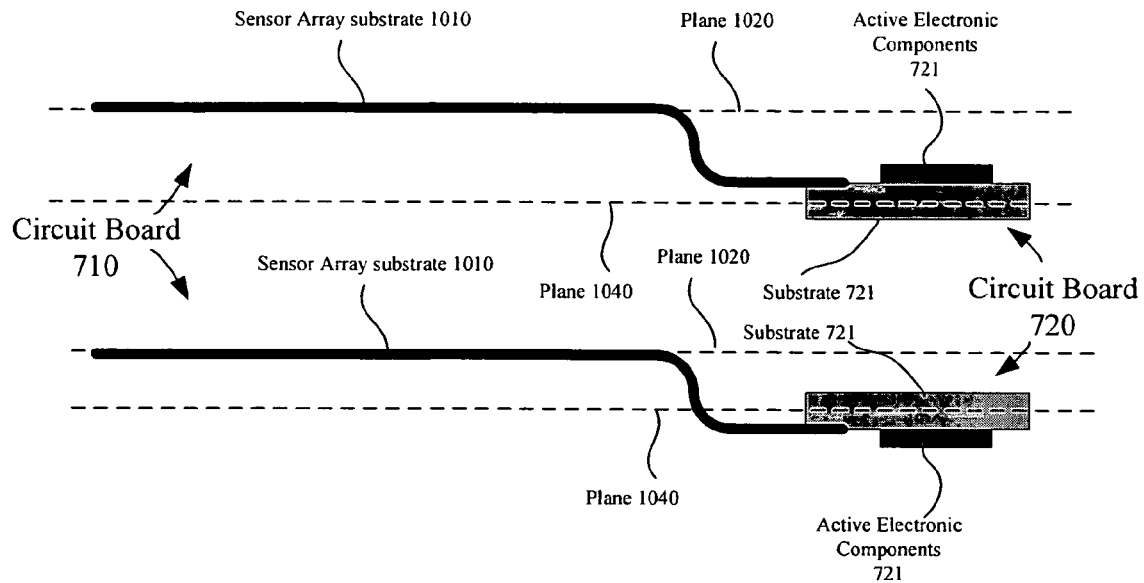
FIG. 10B illustrates cross-sectional views of two embodiments of a sensor array substrate of a first circuit board coupled to a substrate of a second circuit board that is substantially parallel to the plane of the first circuit board.

FIG. 10B illustrates cross-sectional views of two embodiments of a sensor array substrate 1010 of a first circuit board 710 coupled to a substrate 721 of a second circuit board 720 in a plane 1040 that is substantially parallel to the plane 1020 of the first circuit board 710. The embodiments of FIG. 10B are similar to the embodiments of 10A, except the second circuit board 720 is disposed substantially parallel to the plane 1020 of the first circuit board 710. In one embodiment, the sensor array substrate 1010 includes a bend in the substrate to form an inverted-S-shaped bend. In one embodiment, the inverted-S-bend curves from the plane 1020 of a first circuit board 710 toward a second plane 1040 of the second circuit board 720, which is substantially parallel to the plane 1020 of the first circuit board. As illustrated in the two embodiments of FIG. 10B, the second circuit board 720 may be coupled to either side of the sensor array substrate 1010.

In another embodiment, the sensor array 1010 includes a bend in the substrate to form an S-shaped bend. In this embodiment, the S-bend starts curves from the plane 1020 of a first circuit board 710 toward a second plane 1040 of the second circuit board 720, which is substantially parallel to the plane 1020 of the first circuit board. However, the second plane 1040 is above the plane 1020 of the first circuit board 710, instead of below like the second circuit board of the embodiments illustrated in FIG. 10B.

Figure 10C:
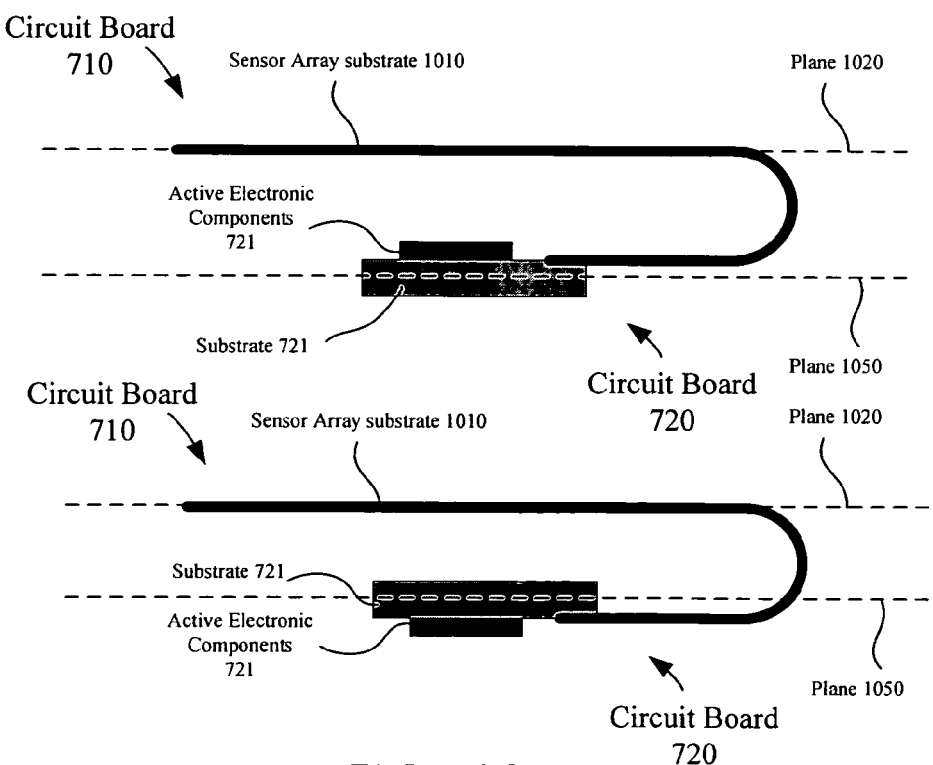
FIG. 10C illustrates cross-sectional views of another two embodiments of a sensor array substrate of a first circuit board coupled to a second circuit board that is substantially parallel to the plane of the first circuit board.

FIG. 10C illustrates cross-sectional views of another two embodiments of a sensor array substrate 1010 of a first circuit board 710 coupled to a second circuit board 720 in a plane 1050 that is substantially parallel to the plane 1020 of the first circuit board 710. The embodiments of FIG. 10C are similar to the embodiments of 10A, except the second circuit board 720 is disposed in a plane 1050 substantially parallel to the plane 1020 of the first circuit board 710. In one embodiment, the sensor array substrate 1010 includes a bend in the substrate to form a U-shaped bend. In one embodiment, the U-bend curves from the plane 1020 of a first circuit board 710 toward a second plane 1050 of the second circuit board 720, which is substantially parallel to the plane 1020 of the first circuit board. These embodiments differ from the embodiments of FIG. 10B, in that the second circuit board is disposed such that the second circuit board 720 is below at least a portion of sensor array substrate 1010 of the first circuit board. In another embodiment, the U-shaped bend may be disposed such that the sensor array substrate 1010 is below the substrate 721 of the second circuit board 720. As illustrated in the two embodiments of FIG. 10C, the second circuit board 720 may be coupled to either side of the sensor array substrate 1010.

The embodiments described above include only a sensor array on the first circuit board 710. In another embodiment, the first circuit board may include a sensor array and a keyboard matrix. Alternatively, the sensor array and the keyboard matrix may be disposed on separate substrates of different circuit boards, and the active electronic components 721 on one or more additional circuit boards.

Figure 11A:
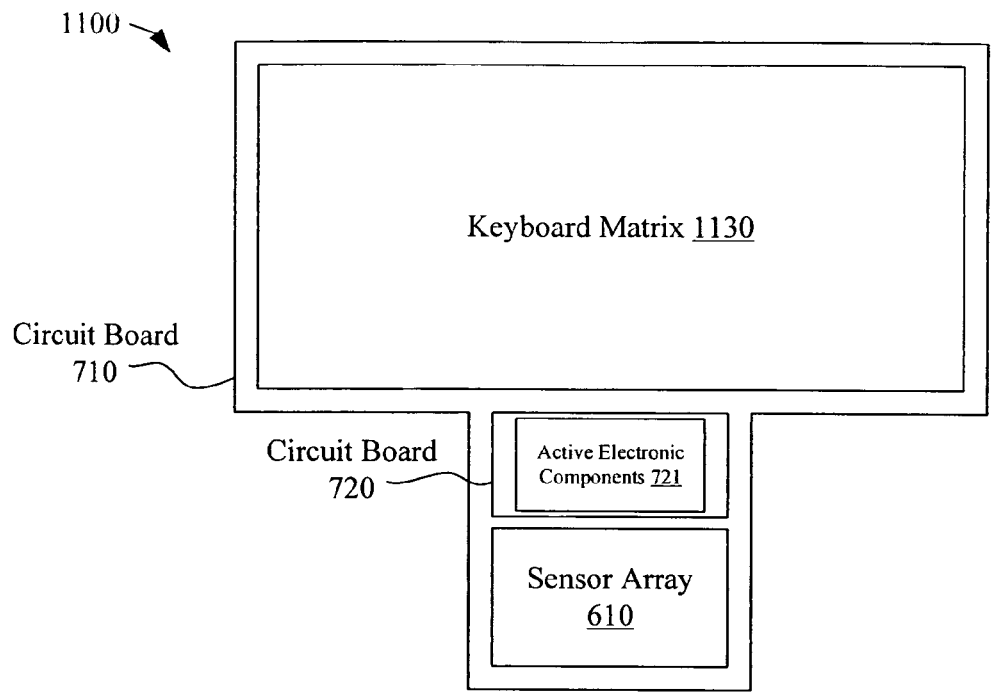
FIG. 11A illustrate a top-side view of one embodiment of an electronic system having a sensor array and a keyboard matrix on a first circuit board and active electronics on a second circuit board.

FIG. 11A illustrate a top-side view of one embodiment of an electronic system having a sensor array and a keyboard matrix on a first circuit board and active electronics on a second circuit board. Electronic system 1100 includes two circuit boards, first circuit board 710 and second circuit board 720. The second circuit board 720 includes the active electronic components 721, as described above. The first circuit board 710 includes a keyboard matrix 1130 and sensor array 610.

The keyboard matrix 1130 may be a conventional keyboard matrix, as described above. For example, the keyboard matrix 1130 may be constructed as two thin sheets of plastic or polymer (e.g., PET) with conductive traces (e.g., silver ink) printed on them, arranged such that when pressure is applied at certain locations, one trace on one sheet makes an electrical connection with one trace at the corresponding location on the other sheet. The keyboard buttons are each positioned over one of these locations, so that when the keyboard button is pressed, pressure is applied to the upper sheet at one of these locations causing it to touch a trace on the lower sheet, causing an electrical contact to be made. In one embodiment, the two sheets are separated by a third sheet with no traces printed, and holes located at each of the button positions, so that when no pressure is applied to the area above the hole, the conductive traces on each of the other two sheets are not in contact.

The traces on the two printed sheets are arranged such that each trace on the upper sheet crosses each trace on the lower sheet over a hole once and only once. In this way, each button on the keyboard makes a unique contact between one of the traces on the upper sheet and one of the traces on the lower sheet. In one embodiment, one sheet has eight traces (referred to as the key matrix Rows) and the other sheet has sixteen traces (referred to as Columns) (e.g., 8×16). Alternatively, more or less traces may be used, such as 24 (e.g., 8×24). In this way, a matrix is formed, with each button corresponding to a single point in the matrix.

In one embodiment, the keyboard matrix 1130 of the first circuit board 710 is connected to the second circuit board 720 using of compression contact such as pressure contact connector 810. The second to circuit board 720 includes active electronic components 721, which may include a keyboard controller, such as a keyboard controller integrated circuit mounted to the substrate of the second circuit board 720. In another embodiment, the row traces on the lower side of the upper sheet contact with short traces on the upper side of the lower sheet, and these short connecting traces, and also the column traces on the lower sheet contact to contacts on the second circuit board 720 (e.g., carbon-printed pads). A non-conducting rubber elastomer is situated in a groove in the keyboard enclosure, and the sheets (e.g., layers of the first circuit board) are laid over the elastomer (with the contacts on the lower sheet facing upwards). The second circuit board 720 may be placed so that the contacts on the second circuit board 720 (e.g., carbon-printed contact pads) are facing the contacts of the lower sheet contacts disposed on the keyboard matrix substrate, and the second circuit board 720 may be screwed down with screws into the keyboard enclosure. By screwing down the second circuit board 720 to the keyboard enclosure, the elastomer is under compression, making a pressure contact between the sheet contacts and the contacts of the second circuit board 720. Alternatively, keyboard matrix 1130 of the first circuit board 710 is connected to the second circuit board 710 using other the other embodiments described herein, or using other connecting mechanisms known by those of ordinary skill in the art.

Similarly, the sensor array 610 of the first circuit board 710 is connected to the second circuit board 720 using but the embodiments described herein or using other connecting mechanisms known by those of ordinary skill in the art. In one embodiment, the sensor array 610 of the first circuit board 710 is disposed on one or more substrate. In one embodiment, the sensor array 610 is disposed on one of the one or more substrates of the keyboard matrix 1130. Alternatively, the sensor array 610 is disposed on one or more substrates that are separate from the one or more substrate of the keyboard matrix 1130.

In one embodiment, the first circuit board 710 of FIG. 11A includes a keyboard matrix sensing area and a touchpad sensing area. The keyboard matrix sensing area includes the keyboard matrix 1130 and the touchpad sensing area includes the sensor array 610. Alternatively, the keyboard matrix sensing area may be disposed on one circuit board (e.g., traces of the keyboard matrix 1130 may be printed on sheets of polymer film as described above), and the touchpad sensing area may be disposed on another circuit board (e.g., sensor elements and/or interconnecting sensor traces of sensor array 610 may be printed on one or more sheets of polymer film as described above), as illustrated below with respect to FIG. 11C.

Figure 11B:
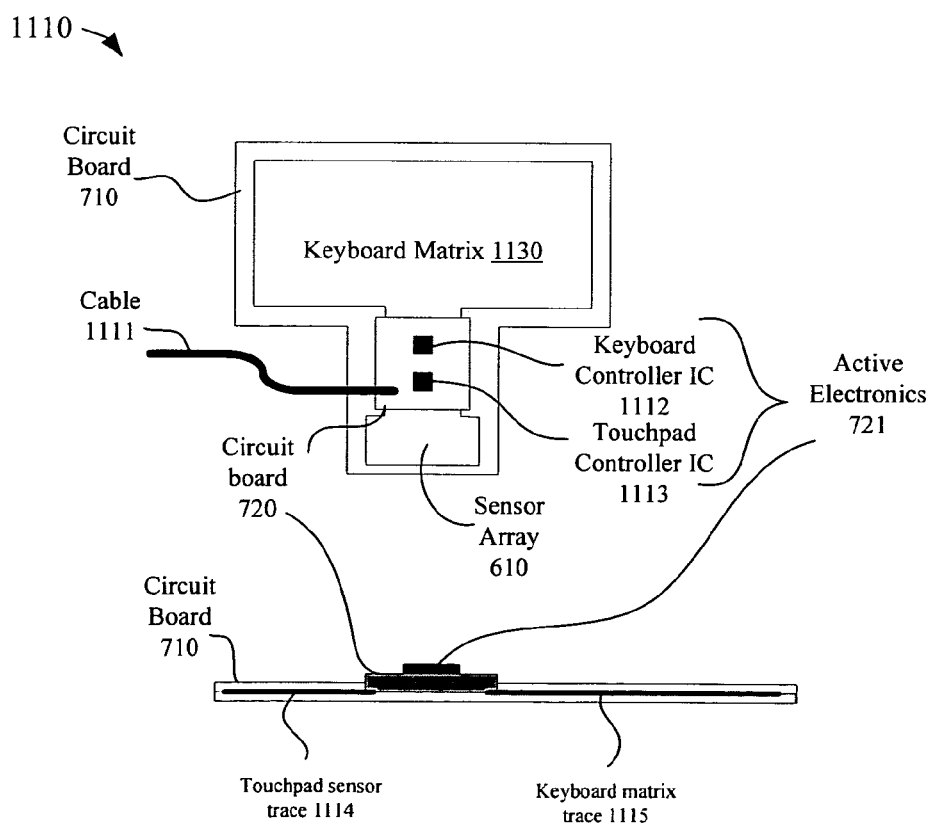
FIG. 11B illustrate top-side and cross-sectional views of one embodiment of an electronic system having a sensor array and a keyboard matrix on a first circuit board, and keyboard controller IC and a touchpad controller IC on a second circuit board.

FIG. 11B illustrate top-side and cross-sectional views of one embodiment of an electronic system having a sensor array and a keyboard matrix on a first circuit board, and keyboard controller IC and a touchpad controller IC on a second circuit board. Electronic system 1110 is similar to the electronic system 1100 of FIG. 11A, however, the active electronics 721 of the second circuit board 720 include a keyboard controller IC 1112 and a touchpad controller IC 1113 disposed on the second circuit board. FIG. 11B also illustrates a cable 1111 coupled to the second circuit board 720. The cable 1111 may be coupled to the rest of the system, such as a host computer. The cable 1111 may be configured to receive and transmit commands and/or signals to and from the second circuit board 720 and the rest of the system. In one embodiment, the cable 1111 is a USB cable. Alternatively, other types of cables may be used.

FIG. 11B also illustrates a cross-sectional view of the electronic system 1110. The first circuit board 710 includes the touchpad sensor trace 1114 and the keyboard matrix trace 1115. The touchpad sensor trace 1114 may be one or more sensor elements and interconnecting sensor traces described above. In one embodiment, the first circuit board 710 includes one common substrate upon which at least one sensor element (e.g., touchpad sensor trace 1114) and one keyboard matrix trace (e.g., keyboard matrix trace 1115) are disposed. Although only one touchpad sensor trace 1114 has been illustrated, the embodiments may include additional touchpad sensor traces. In one embodiment, the touchpad sensor traces may be disposed in a single plane of a single-layer circuit board. In another embodiment, the touchpad sensor traces may be disposed in two planes of a single-layer circuit board. In another embodiment, the touchpad sensor traces may be implemented in different layers of a multi-layer circuit board, such as two- or four-layer circuit boards. Similarly, although only one keyboard matrix sensor trace 1115 has been illustrated, the embodiments may include additional keyboard matrix traces, and the keyboard matrix traces may be implemented in multiple planes and/or in multiple layers of the first circuit board 710.

In one embodiment, the first circuit board 710 includes three layers, two sheets of polymer film (e.g., PET) with conductive traces printed in a keyboard matrix sensing area, arranged such that when pressure is applied at certain locations, one trace on one sheet makes an electrical connection with one trace at the corresponding location on the other sheet. The third layer is an additional sheet disposed between the two sheets of polymer film, however, the third layer has no traces printed on it, and includes holes located at each of the button positions, so that when no pressure is applied to the area above the hole, the conductive traces on each of the other two sheets are not in contact.

In the touchpad sensing area, one layer of the three layers may include conductive traces (e.g., sensor elements and/or interconnecting sensor traces or sensor traces as describe above) printed on one or more of the three layers of polymer film. In one embodiment, the conductive traces are printed on only the top layer, for example, a first set of sensor elements and interconnecting sensor traces on one side of the first sheet of polymer film and a second set of sensor elements and interconnecting sensor traces on the other side of the polymer film, or both sets of sensor elements are printed on the same side of the first sheet of polymer film. Alternatively, the conductive traces are printed on the first and second, first and third sheets, the second and third sheets, or any combination thereof.

In another embodiment, the touchpad sensing area of the first circuit board 710 may include more or less layers than the keyboard matrix sensing area of the first circuit board 710.

Figure 11C:
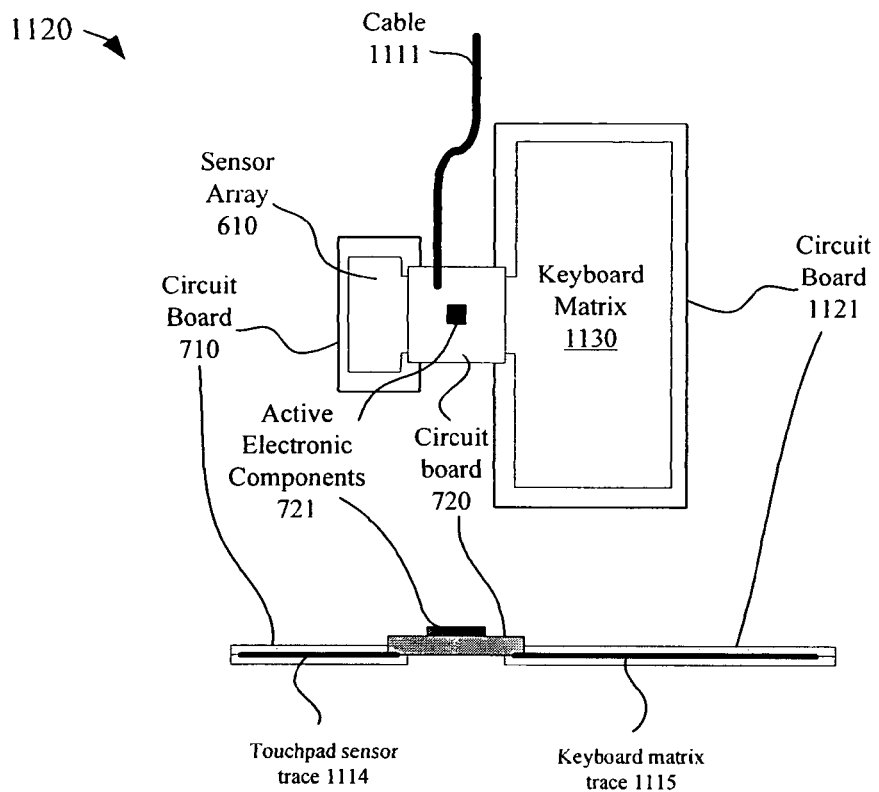
FIG. 11C illustrate top-side and cross-sectional views of one embodiment of an electronic system having a sensor array on a first circuit board, active electronic components on a second circuit board, and a keyboard matrix on a third circuit board.

FIG. 11C illustrate top-side and cross-sectional views of one embodiment of an electronic system having a sensor array on a first circuit board, active electronic components on a second circuit board, and a keyboard matrix on a third circuit board. Electronic system 1120 is similar to the electronic system 1110 of FIG. 11B, however, the sensor array 610 is disposed on a first circuit board 710, the active electronics 721 are disposed on the second circuit board 720, and the keyboard matrix 1130 is disposed on a third circuit board 1121. The active electronic components 721 may include a single IC, disposed on the second circuit board 720, that incorporates the functionality of both a keyboard controller and a touchpad controller. Alternatively, the active electronic components 721 may include two separate ICs, disposed on the second circuit board 720, such as the keyboard controller keyboard controller IC 1112 and the touchpad controller IC 1113 of FIG. 11B.

FIG. 11C also illustrates a cross-sectional view of the electronic system 1120. The first circuit board 710 includes the touchpad sensor trace 1114 and the third circuit board 1121 includes the keyboard matrix trace 1115. The touchpad sensor trace 1114 one or more sensor elements and interconnecting sensor traces described above. Although only one touchpad sensor trace 1114 has been illustrated, the embodiments may include additional touchpad sensor traces. In one embodiment, the touchpad sensor traces may be disposed in a single plane of a single-layer circuit board. In another embodiment, the touchpad sensor traces may be disposed in two planes of a single-layer circuit board. In another embodiment, the touchpad sensor traces may be implemented in different layers of a multi-layer circuit board, such as two- or four-layer circuit boards. Similarly, although only one keyboard matrix sensor trace 1115 has been illustrated, the embodiments may include additional keyboard matrix traces, and the keyboard matrix traces may be implemented in multiple planes and/or in multiple layers of the first circuit board 710.

In one embodiment, the first circuit board 710 includes two layers and the second circuit board 720 includes three layers. Alternatively, the first circuit board 710 may include more or less layers than two, and the second circuit board 720 may include more or less layers than three.

Figure 11D:
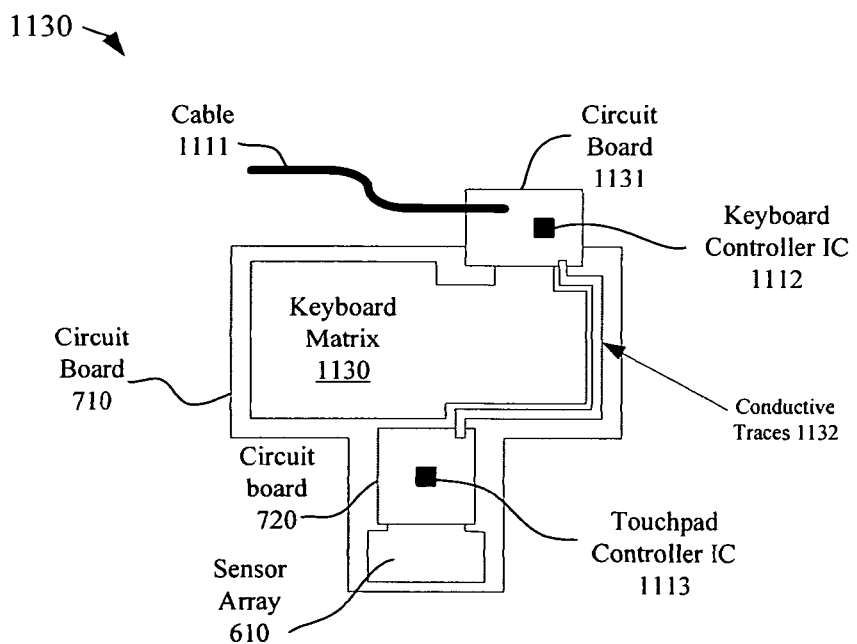
FIG. 11D illustrate a top-side view of one embodiment of an electronic system having a sensor array and a keyboard matrix on a first circuit board, a touchpad controller on a second circuit board, and a keyboard controller on a third circuit board.

FIG. 11D illustrate a top-side view of one embodiment of an electronic system having a sensor array and a keyboard matrix on a first circuit board, a touchpad controller on a second circuit board, and a keyboard controller on a third circuit board. Electronic system 1130 is similar to the electronic system 1110 of FIG. 11B, however, the sensor array 610 and keyboard matrix 1130 are disposed on a first circuit board 710, touchpad controller IC 1113 of the active electronics 721 is disposed on the second circuit board 720, and the keyboard controller IC 1112 of the active electronic components 721 is disposed on a third circuit board 1131. The active electronics 721 of the two circuit boards 720 and 1131 may be configured to communicate over conductive traces disposed on the first circuit board 710, instead of using an interconnecting cable, such as done in the conventional designs. In another embodiment, the active electronics 721 of the two circuit boards 720 and 1131 may be configured to communicate over an interconnecting cable.

In another embodiment, the sensor array 610 is disposed on a first circuit board 710, touchpad controller IC 1113 of the active electronics 721 is disposed on the second circuit board 720, the keyboard controller IC 1112 of the active electronic components 721 is disposed on a third circuit board 1131, and the keyboard matrix 1130 is disposed on a fourth circuit board (not illustrated in FIG. 11D). Similarly, the active electronics 721 of the two circuit boards 720 and 1131 may be configured to communicate over conductive traces disposed on the first circuit board 710, or alternatively, over conductive traces disposed on the fourth circuit board. Alternatively, the active electronics 721 of the two circuit boards 720 and 1131 may be configured to communicate over an interconnecting cable.

It should be noted that the locations of the keyboard matrix and the sensor array with respect to one another, and with respect to the second circuit board 720 is not limited to the embodiment illustrated in FIGS. 11A-11D, but may include other configurations, such as the keyboard matrix being disposed below, or to the side of, the sensor array of the touchpad.

Embodiments described herein may be implemented in various touch sensing devices with the sensors on one circuit board (e.g., PCB) and the active electronics on another circuit boards (e.g., PCB). In one embodiment, the touch sensing device includes a touch panel having one or more touch-sensor buttons on the first circuit board and the processing device on the second circuit board. In another embodiment, the first circuit board includes sensor elements of a slider. In another embodiment, the first circuit board includes sensor elements for one or more buttons and a slider. In another embodiment, a touchpad is disposed on the first circuit board and the processing device on the second circuit board. In another embodiment, the first circuit board that includes the touchpad includes touch-sensor buttons and/or sliders. In another embodiment, the first circuit board includes a touchpad and a keyboard matrix. Alternatively, the embodiments described herein may be implemented in other combinations of touch-sensor buttons, sliders, and touchpads.

In one embodiment, the method of operation includes providing a first circuit board including a sensor array of sensor elements of a touchpad, wherein the first circuit board comprises no active electronic components to measure capacitance, and detecting a presence of a conductive object on the touchpad of the first circuit board using active electronic components of a second circuit board coupled to the first circuit board. The method may further include measuring a capacitance on the sensor array using the active electronic components of the second circuit board, and processing the measured capacitance. In another embodiment, the first circuit board comprises a keyboard matrix and the method further includes detecting a button press on the keyboard matrix.

FIG. 12 illustrates a flow chart of one embodiment of a method 1200 for manufacturing an electronic system having multiple circuit boards. The method 1200 of manufacturing a touchpad includes disposing one or more sensor elements and interconnecting sensor traces on one or more substrates, which include no active electronic components mounted on it, operation 1201. The active electronic components, which include the capacitance sensing circuitry, can be mounted to a circuit board that includes one or more substrates that are separate entities than the one or more substrates that include no active electronic components, operation 1202. The method may also include connecting the one or more substrates that include no active electronic components to the circuit board that includes the active electronic components, operation 1203. For example, the connection may be made by disposing conductive contacts on one side of the one or more substrates that includes the sensor array, disposing conductive contacts on the circuit board, disposing the conductive contacts of both the one or more substrates and the circuit board to be in contact to form an electrical connection. In order to maintain the electrical connection, the method may include disposing a pressure contact connector (e.g., compressive clamp) on the electrical connection. For example, the pressure contact connector may include a compressive material, a housing, and a fastener.

In one embodiment, the one or more substrates may be a single sheet of polymer film (e.g., PET) printed with conductive ink to form the sensor elements and/or the interconnecting sensor traces. Alternatively, other materials may be used for the one or more substrates. In one embodiment, the conductive ink includes silver. Alternatively, the conductive ink may include other materials, such as carbon.

In one embodiment, the sensor array may be disposed on a single-sided circuit board. In another embodiment, the sensor array may be disposed on a two-sided circuit board, where a first set of sensor elements and interconnecting sensor traces are printed on a first side and a second set of sensor elements and interconnecting sensor traces are printed on a second side. In another embodiment, all the sensor elements and interconnecting sensor traces are disposed on the same side of the circuit board. In another embodiment, all the sensor elements and one set of the interconnecting sensor traces is printed on a first side and the second set of interconnecting sensor traces is printed on a second side. The second set of interconnecting sensor traces make electrical contact with a second set of sensor elements using vias.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
providing a first circuit board including a first capacitive sense array of sense elements and interconnecting sensor traces disposed on a first side of the first circuit board and a second capacitive sense array of sense elements and interconnecting sensor traces disposed on a second side of the first circuit board, wherein the first circuit board comprises no active electronic components to detect a presence of a conductive object on the capacitive sense array; and
detecting a presence of a conductive object on the first and second capacitive sense array of the first circuit board using active electronic components of a second circuit board coupled to the first circuit board, wherein the second circuit board is one-sided and comprises a set of conductive contacts on one side of the second circuit board, the set of conductive contacts to provide signals from the first capacitive sense array of sense elements and the second capacitive sense array of sense elements to the active electronic components, and wherein the first and second circuit boards are coupled with a pressure contact connector having conductive ink traces coupled to the first interconnecting sensor traces and to the set of conductive contacts, and wherein the second interconnecting sensor traces are coupled directly to the set of conductive contacts on the one-sided second circuit board.

2. The method of claim 1, wherein detecting the presence of the conductive object comprises:
measuring a capacitance on the first and second capacitive sense array using the active electronic components of the second circuit board; and
processing the measured capacitance.

3. The method of claim 1, wherein the first circuit board further comprises a keyboard matrix, and wherein the method further comprises detecting a button press on the keyboard matrix.

4. A method, comprising:
providing a first circuit board including a substrate with a first plurality of capacitive sense elements and interconnecting sensor traces disposed on a first side of the substrate and a second plurality of capacitive sense elements and interconnecting sensor traces disposed on a second side of the substrate, wherein the first circuit board comprises no active electronic components to detect a presence of a conductive object on the plurality of capacitive sense elements;
providing a second circuit board, wherein the second circuit board is one-sided and comprises a set of conductive contacts on one side of the second circuit board, the set of conductive contacts to provide signals from the first plurality of capacitive sense elements and interconnecting sensor traces and the second plurality of capacitive sense elements and interconnecting sensor traces to active electronic components to detect a presence of a conductive object on the first and second plurality of capacitive sense elements; and
coupling the first and second circuit boards with a pressure contact connector having conductive ink traces coupled to the first plurality of interconnecting sensor traces and to the set of conductive contacts, wherein the second plurality of interconnecting sensor traces are coupled directly to the set of conductive contacts on the one-sided second circuit board.

5. The method of claim 4, wherein providing the first circuit board comprises:
disposing a single sheet of polymer film as a substrate of the one or more substrates; and
printing conductive ink on the single sheet of polymer film to form the first and second plurality of capacitive sense elements and interconnecting sensor traces of the first circuit board.

6. The method of claim 5, wherein the single sheet of polymer film is Polyethylene Terephthalate (PET).

7. The method of claim 5, wherein the conductive ink comprises silver.

8. The method of claim 4, wherein the first circuit board and the second circuit board are disposed in different planes and partially overlap.

9. The method of claim 8, wherein the pressure contact connector is a compressive clamp.

10. The method of claim 8, wherein the pressure contact connector is a spring metal clip.

11. The method of claim 4, wherein coupling the first and second circuit boards comprises:
providing a set of conductive contacts on one side of the first circuit board; and
disposing the set of conductive contacts on one side of the first circuit board and the set of conductive contacts on the second circuit board to be in contact with each other.

12. The method of claim 11, wherein disposing both sets of conductive contacts comprises:
disposing a compressive material on the first circuit board;
disposing a housing on the compressive material; and
making a compression contact with a fastener.

13. The method of claim 4, further comprising disposing row and column traces of a keyboard matrix on the one or more substrates of the first circuit board.

14. The method of claim 4, wherein coupling the first and second circuit boards comprises coupling the first and second circuit boards using anisotropic conductive adhesive.

15. The method of claim 4, wherein coupling the first and second circuit boards comprises coupling the first and second circuit boards using an elastomer and screw.

16. An apparatus, comprising:
a first circuit board including a first capacitive sense array of sense elements and a first plurality of interconnecting sensor traces disposed on a first side of the first circuit board and a second capacitive sense array and a second plurality of interconnecting sensor traces disposed on a second side of the first circuit board; and
a one-sided second circuit board coupled to the first circuit board, including a set of conductive contacts on one side of the second circuit board, the set of conductive contacts to provide signals from the first capacitive sense array of sense elements and interconnecting sensor traces and the second capacitive sense array of sense elements and interconnecting sensor traces to sensing circuitry to measure capacitance on the first and second capacitive sense array of the first circuit board, wherein the first and second circuit boards are coupled with a pressure contact connector having conductive ink traces coupled to the first plurality of interconnecting sensor traces and to the set of conductive contacts, and wherein the second plurality of interconnecting sensor traces are coupled directly to the set of conductive contacts on the one-sided second circuit board.

17. The apparatus of claim 16, wherein the first circuit board comprises polymer film.

18. The apparatus of claim 16, wherein the second circuit board comprises processing circuitry to process the measured capacitance.

19. The apparatus of claim 18, further comprising a processing device disposed on the second circuit board and coupled to the capacitive sense array of the first circuit board, wherein the processing device comprises the sensing circuitry and the processing circuitry.

20. The apparatus of claim 18, further comprising a third circuit board coupled to the second circuit board, wherein the third circuit board comprises a host processing device.

21. The apparatus of claim 16, further comprising a connector to couple the first circuit board and the second circuit board.

22. The apparatus of claim 21, wherein the connector comprises a fastener.

23. The apparatus of claim 21, wherein the connector comprises an anisotropic conductive adhesive.

24. The apparatus of claim 21, wherein the connector comprises a screw and an elastomer.

25. The apparatus of claim 16, wherein the first circuit board comprises a single sheet of polymer film as a substrate and conductive ink as a plurality of capacitive sense elements and interconnecting sensor traces of the capacitive sense array.

26. The apparatus of claim 16, wherein the first circuit board comprises:
a single sheet of polymer film as a substrate;
a first layer of conductive ink to form a first set of capacitive sense elements and interconnecting sensor traces of the capacitive sense array;
a second layer of conductive ink to form a second set of capacitive sense elements and interconnecting sensor traces of the capacitive sense array; and
an insulating ink disposed between the first and second layers of conductive ink.

27. The apparatus of claim 26, wherein the polymer film is Polyethylene Terephthalate (PET).

28. The apparatus of claim 27, wherein the conductive ink comprises silver.

29. The apparatus of claim 16, wherein the first circuit board comprises no active electronic components to measure capacitance on the plurality of capacitive sense elements, and wherein the second circuit board comprises active electronic components to measure capacitance on the plurality of capacitive sense elements.

30. An apparatus, comprising:
a first circuit board comprising a first plurality of capacitive sense elements and interconnecting sensor traces disposed on a first side of the first circuit board and a second plurality of capacitive sense elements and interconnecting sensor traces disposed on a second side of the first circuit board; and
means for detecting a presence of a conductive object on the plurality of capacitive sense elements of the first circuit board, wherein the means for detecting the presence of the conductive object is disposed on a one-sided second circuit board that is not the first circuit board and comprising a set of conductive contacts on one side of the second circuit board, the set of conductive contacts to provide signals from the first plurality of capacitive sense elements and interconnecting sensor traces and the second plurality of capacitive sense elements and interconnecting sensor traces to the means for detecting the presence, wherein the first circuit board is coupled to the second circuit board with a pressure contact connector having conductive ink traces coupled to the first plurality of interconnecting sensor traces and to the set of conductive contacts, and wherein the second plurality of interconnecting traces are coupled directly to the set of conductive contacts on the one-sided second circuit board.

31. The apparatus of claim 30, wherein the means for detecting the presence of the conductive object comprise:
means for measuring capacitance on the sense array of the first circuit board; and
means for processing the measured capacitance.

32. The apparatus of claim 30, further comprising means for connecting the first circuit board and the means for detecting.

33. A system, comprising:
a first capacitive sense array of capacitive sense elements and a first plurality of interconnecting sensor traces disposed on a first side of a first circuit board and a second capacitive sense array of capacitive sense elements and a second plurality of interconnecting sensor traces disposed on a second side of the first circuit board, wherein the first circuit board comprises no active electronic components to detect a presence of a conductive object on the capacitive sense array;
a keyboard matrix comprised of conductive traces disposed on the first circuit board; and
a second circuit board coupled to the first circuit board, wherein the second circuit board is one-sided and comprises a set of conductive contacts on one side of the second circuit board, the set of conductive contacts to provide signals from the first capacitive sense array of capacitive sense elements and interconnecting sensor traces and the second capacitive sense array of capacitive sense elements and interconnecting sensor traces to active electronic components to detect the presence of the conductive object on the capacitive sense array, wherein the first and second circuit boards are coupled with a pressure contact connector having conductive ink traces coupled to the first plurality of interconnecting sensor traces and to the set of conductive contacts, and wherein the second plurality of interconnecting sensor traces are coupled directly to the set of conductive contacts on the one-sided second circuit board.

34. The system of claim 33, wherein the active components comprise:
a first integrated circuit that is mounted to a substrate of the second circuit board; and
a second integrated circuit that is mounted to the substrate of the second circuit board, wherein the first integrated circuit is a touch-sensor pad controller, and wherein the second integrated circuit is a keyboard controller.

35. The system of claim 33, wherein the keyboard matrix of conductive traces is disposed on a third circuit board coupled to the second circuit board.

36. The system of claim 33, wherein the active electronics are configured to measure a capacitance on the first and second capacitive sense array of the second circuit board.

37. The system of claim 33, wherein the active electronics are configured to detect a button press on one of a plurality of keyboard keys of the keyboard matrix.

* * * * *